US012712705B2

(12) United States Patent
Lin et al.

(10) Patent No.: US 12,712,705 B2
(45) Date of Patent: Aug. 18, 2026

(54) DATA PROCESSING METHODS AND ELECTRONIC DEVICE

(71) Applicant: Beijing Volcano Engine Technology Co., Ltd., Beijing (CN)

(72) Inventors: Yu Lin, Beijing (CN); Quanwei Cai, Beijing (CN); Ye Wu, Beijing (CN)

(73) Assignee: Beijing Volcano Engine Technology Co., Ltd., Beijing (CN)

(*) Notice: Subject to any disclaimer, the term of this patent is extended or adjusted under 35 U.S.C. 154(b) by 424 days.

(21) Appl. No.: 18/450,840

(22) Filed: Aug. 16, 2023

(65) Prior Publication Data

US 2024/0413967 A1 Dec. 12, 2024

(30) Foreign Application Priority Data

Jun. 6, 2023 (CN) ......................... 202310666563.3

(51) Int. Cl.
*H04L 9/00* (2022.01)

(52) U.S. Cl.
CPC .......... *H04L 9/008* (2013.01); *H04L 2209/46* (2013.01)

(58) Field of Classification Search
CPC ..... H04L 9/008; H04L 2209/46; H04L 9/085; G06F 21/602; G06F 21/64
See application file for complete search history.

(56) References Cited

U.S. PATENT DOCUMENTS 11,829,512 B1 * 11/2023 Du ...................... G06F 21/6245
11,874,950 B1 * 1/2024 Du ...................... G06F 21/6245
(Continued)

FOREIGN PATENT DOCUMENTS

CN 111739595 A 10/2020
CN 111753318 A 10/2020
(Continued)

OTHER PUBLICATIONS

International Search Report and Written Opinion received for PCT Patent Application No. PCT/CN2024/097142, mailed on Aug. 22, 2024, 11 pages (2 pages of English Translation and 9 pages of Original Document).

(Continued)

*Primary Examiner* — Philip J Chea
*Assistant Examiner* — Ghizlane Maazouz

(57) ABSTRACT

Data processing methods and electronic device are provided in the present disclosure. A method comprises: obtaining, by a first party, first double-encrypted identification information and a first feature share, a second feature share of first feature information in a first dataset and second double-encrypted identification information and a third feature share of second feature information in a second dataset; determining a first intersection of the first and second datasets by matching the first double-encrypted identification information with the second double-encrypted identification information; performing, using the first feature share, a first round of secure permutation with the second party, to obtain a first target feature share of the first feature information; performing, using the third feature share, a second round of secure permutation with the second party, to obtain a first target feature share of the second feature information; updating the first intersection and performing MPC with the second party.

20 Claims, 9 Drawing Sheets

(56) References Cited

U.S. PATENT DOCUMENTS

| | | | | |
|---|---|---|---|---|
| 11,886,617 | B1 * | 1/2024 | Du | G06F 21/6245 |
| 2015/0149763 | A1 | 5/2015 | Kamara | |
| 2020/0242234 | A1 | 7/2020 | Furukawa et al. | |
| 2021/0248499 | A1 | 8/2021 | Chen et al. | |
| 2021/0391987 | A1 * | 12/2021 | Badrinarayanan | H04L 9/30 |
| 2022/0400107 | A1 | 12/2022 | Moshyedi | |
| 2023/0144140 | A1 * | 5/2023 | Yung | H04L 63/0421 726/26 |
| 2024/0169074 | A1 * | 5/2024 | Leung | G06F 21/53 |
| 2024/0195603 | A1 * | 6/2024 | Wang | H04L 9/008 |
| 2025/0015979 | A1 * | 1/2025 | Weitzner | H04L 63/14 |

FOREIGN PATENT DOCUMENTS

| | | | |
|---|---|---|---|
| CN | 113190871 | A | 7/2021 |
| CN | 114553593 | A | 5/2022 |
| CN | 114697030 | A | 7/2022 |
| CN | 115603905 | A | 1/2023 |
| CN | 115913537 | A | 4/2023 |
| CN | 115967491 | A | 4/2023 |
| CN | 115987484 | A | 4/2023 |
| CN | 116090002 | A | 5/2023 |
| CN | 117077156 | A | 11/2023 |
| WO | 2021/083179 | A1 | 5/2021 |
| WO | 2022/076038 | A1 | 4/2022 |
| WO | 2023/014929 | A1 | 2/2023 |

OTHER PUBLICATIONS

Kai, “Secure multi-party computing system based on blockchain”, Design and Implementation, Jun. 10, 2021, pp. 1-71.

Notification of registration procedures received from Chinese patent application No. 202310666563.3 mailed on Dec. 29, 2024, 6 pages (2 pages English Translation and 4 pages Original Copy).

Office action received from Chinese patent application No. 202310666563.3 mailed on Sep. 4, 2024, 10 pages (4 pages English Translation and 6 pages Original Copy).

European Search Report for EP Patent Application No. 23190139.8, Issued on Feb. 2, 2024, 9 pages.

Pinkas B., “Phasing: Private Set Intersection Using Permutation-based Hashing”, IACR, International Association for Cryptologic Research, Jun. 26, 2015, pp. 1-21.

* cited by examiner

DATA PROCESSING METHODS AND ELECTRONIC DEVICE

CROSS REFERENCE TO RELATED APPLICATIONS

The present application claims priority to Chinese Patent Application No. 202310666563.3, entitled "DATA PROCESSING METHODS AND ELECTRONIC DEVICE," filed on Jun. 6, 2023, the contents of which are hereby incorporated by reference in its entirety.

TECHNICAL FIELD

Example embodiments of the present disclosure generally relate to the field of computers, and in particular to data processing methods, apparatuses, devices, and computer-readable storage mediums.

BACKGROUND

In recent years, due to factors such as user privacy, data security, legal compliance, and commercial competition, it has been difficult to integrate dispersed data sources legally and in compliance with regulations for computation, analysis, and learning. In this context, solutions based on Secure Multi-party Computing (MPC) have developed rapidly, allowing joint computing, joint data analysis, and joint machine learning across multiple dispersed data sources without the need to gather them together. The MPC aims to solve the problem of a group of untrusted parties performing collaborative computing while protecting data security, and to provide the data demander with a multi-party collaborative computing capability without disclosing the original data. The MPC may be used to support secure data cooperation and a fusion application, to collaborate with multiple data sources for computation and analysis on the premise of being legal and compliant with regulations and data not leaving the domain.

SUMMARY

In a first aspect of the present disclosure, a data processing method is provided. The method is implemented at a first party in secure multi-party computing (MPC), and the method comprises: obtaining first double-encrypted identification information and a first feature share and a second feature share of first feature information of respective data entries in a first dataset of the first party, and second double-encrypted identification information and a third feature share of second feature information of respective data entries in a second dataset of a second party in the MPC; determining a first intersection of the first dataset and the second dataset by matching the first double-encrypted identification information with the second double-encrypted identification information, data entries in the first intersection comprising matched identification information, and the second feature share of the first feature information and the third feature share of the second feature information identified by the identification information; performing, using the first feature share of the first feature information, a first round of secure permutation on the first feature information with the second party, to obtain a first target feature share of the first feature information; performing, using the third feature share of the second feature information, a second round of secure permutation on the second feature information with the second party, to obtain a first target feature share of the second feature information; updating the first intersection based on the first target feature share of the first feature information and the first target feature share of the second feature information; and performing the MPC with the second party based on the updated first intersection.

In a second aspect of the present disclosure, a data processing method is provided. The method is implemented at a second party in secure multi-party computing (MPC), and the method comprises: obtaining a fourth feature share of first feature information for respective data entries in a first dataset of a first party in the MPC and first permutation information for the first dataset, and a first feature share of second feature information for respective data entries in a second dataset of the second party; performing, using the first permutation information and the fourth feature share of the first feature information, a first round of secure permutation on the first feature information with the first party, to obtain a second target feature share of the first feature information; performing, using the first feature share of the second feature information, a second round of secure permutation on the second feature information with the first party, to obtain a second target feature share of the second feature information; generating a second intersection for the first dataset and the second dataset based on the second target feature share of the first feature information and a first target feature share of the second feature information; and performing the MPC with the first party based on the second intersection.

In a third aspect, a data processing apparatus is provided. The apparatus is implemented at a first party in secure multi-party computing (MPC), and the apparatus comprises: an information obtaining module configured to obtain first double-encrypted identification information and a first feature share and a second feature share of first feature information of respective data entries in a first dataset of the first party, and second double-encrypted identification information and a third feature share of second feature information of respective data entries in a second dataset of a second party in the MPC; a first intersection determination module configured to determine a first intersection of the first dataset and the second dataset by matching the first double-encrypted identification information with the second double-encrypted identification information, data entries in the first intersection comprising matched identification information, and the second feature share of the first feature information and the third feature share of the second feature information identified by the identification information; a first secure permutation module configured to perform, using the first feature share of the first feature information, a first round of secure permutation on the first feature information with the second party, to obtain a first target feature share of the first feature information; a second secure permutation module configured to perform, using the third feature share of the second feature information, a second round of secure permutation on the second feature information with the second party, to obtain a first target feature share of the second feature information; an intersection update module configured to update the first intersection based on the first target feature share of the first feature information and the first target feature share of the second feature information; and an MPC performing module configured to perform the MPC with the second party based on the updated first intersection.

In a fourth aspect, a data processing apparatus is provided. The apparatus is implemented at a second party in secure multi-party computing (MPC), and the apparatus comprises: an information obtaining module configured to obtain a fourth feature share of first feature information for respective data entries in a first dataset of a first party in the MPC and first permutation information for the first dataset, and a first feature share of second feature information for respective data entries in a second dataset of the second party; a first secure permutation module configured to perform, using the first permutation information and the fourth feature share of the first feature information, a first round of secure permutation on the first feature information with the first party, to obtain a second target feature share of the first feature information; a second secure permutation module configured to perform, using the first feature share of the second feature information, a second round of secure permutation on the second feature information with the first party, to obtain a second target feature share of the second feature information; a second intersection generation module configured to generate a second intersection for the first dataset and the second dataset based on the second target feature share of the first feature information and a first target feature share of the second feature information; and an MPC performing module configured to perform the MPC with the first party based on the second intersection.

In a fifth aspect, an electronic device is provided. The device comprises at least one processing module; and at least one memory coupled to the at least one processing module and storing instructions executable by the at least one processing module, the instructions, when executed by the at least one processing module, causing the device to perform the method of the first aspect.

In a sixth aspect, an electronic device is provided. The device comprises at least one processing module; and at least one memory coupled to the at least one processing module and storing instructions executable by the at least one processing module, the instructions, when executed by the at least one processing module, causing the device to perform the method of the second aspect.

In a seventh aspect, a computer readable storage medium is provided. The computer readable storage medium has a computer program stored thereon which, when executed by a processor, performs the method of the first aspect.

In an eighth aspect, a computer readable storage medium is provided. The computer readable storage medium has a computer program stored thereon which, when executed by a processor, performs the method of the second aspect.

It would be appreciated that the content described in the Summary section of the present disclosure is neither intended to identify key or essential features of the embodiments of the present disclosure, nor is it intended to limit the scope of the present disclosure. Other features of the present disclosure will be readily envisaged through the following description.

BRIEF DESCRIPTION OF DRAWINGS

The above and other features, advantages and aspects of the embodiments of the present disclosure will become more apparent in combination with the accompanying drawings and with reference to the following detailed description. In the drawings, the same or similar reference symbols refer to the same or similar elements, where.

DETAILED DESCRIPTIONS

Figure 1:
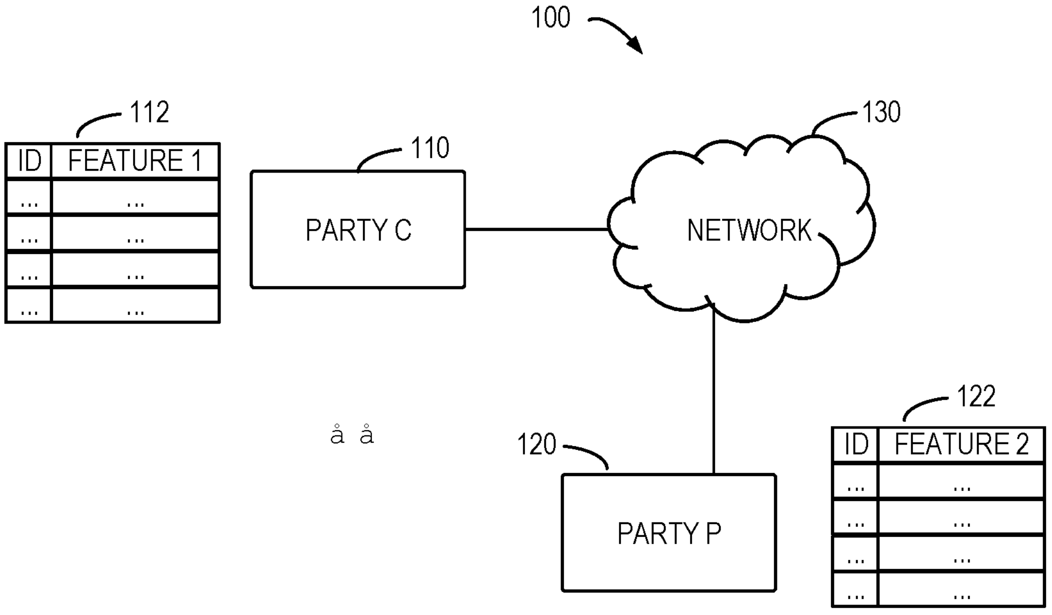
FIG. 1 shows a schematic diagram of an example environment in which the embodiments of the present disclosure can be applied.

The embodiments of the present disclosure will be described in more detail below with reference to the accompanying drawings. Although some embodiments of the present disclosure are shown in the drawings, it would be appreciated that the present disclosure can be implemented in various forms and should not be interpreted as limited to the embodiments described herein. On the contrary, these embodiments are provided for a more thorough and complete understanding of the present disclosure. It would be appreciated that the drawings and embodiments of the present disclosure are only for purpose of illustration and are not intended to limit the scope of protection of the present disclosure.

In the description of the embodiments of the present disclosure, the term "including" and similar terms should be understood as open inclusion, that is, "including but not limited to". The term "based on" should be understood as "at least partially based on". The term "one embodiment" or "the embodiment" should be understood as "at least one embodiment". The term "some embodiments" should be understood as "at least some embodiments". Other explicit and implicit definitions may also be included below.

In this article, unless explicitly stated, performing a step "in response to A" does not mean performing the step immediately after "A", but may include one or more intermediate steps.

It is understandable that the data involved in this technical proposal (including but not limited to the data itself, data acquisition, use, storage, or deletion) shall comply with the requirements of corresponding laws, regulations and relevant provisions.

Firstly, a brief introduction is given to the terms involved in the embodiments of the present disclosure.

Secret share: an encryption method that splits a data value into multiple copies through some operation. For example, additive Secret share may split a data value into $x=x_1+x_2$ two secret share values.

Secure multi-party computing (MPC): refers to the existence of N parties P1, P2, . . . , PN, where a party Pi has input data Xi, and N parties jointly calculate a function f (X1, X2, . . . , XN) without disclosing their input data to any other parties. The security of input data may be ensured by applying cryptography (such as Homomorphic Encryption), the secret share, differential privacy and other security mechanisms in the operation. For example, a secret share value of input data of multiple parties may calculate a specified arithmetic operation, a logic operation, and an output operation result is still in the form of secret share.

Elliptic Curve Diffie-Hellman key Exchange (ECDH): two parties implement a key exchange through the elliptic curve encryption algorithm.

Homomorphic Encryption (HE): is one of the methods to implement secure multi-party computation. Homomorphic Encryption allows performing a specific form of algebraic operation on ciphertext to obtain an operation result which is still in a ciphertext space. The encrypted data may be calculated through homomorphic addition, multiplication, and other operations to obtain new ciphertext without decrypting the data. After decrypting the new ciphertext, data that has undergone a corresponding homomorphic operation may be obtained. That is to say, an operation in the ciphertext space is equivalent to an operation in a plaintext space. Therefore, a Homomorphic Encryption technology may be used to operate on the encrypted data without decrypting data in the whole operation process.

FIG. 1 shows a schematic diagram of an example environment 100 in which embodiments of the present disclosure can be applied. The environment 100 relates to secure computation based on an MPC protocol. For purpose of illustration, a party 110 (sometimes referred to as a first party, a party C, or a C party herein) and a party 120 (also referred to as a second party, a party P, or a P party) are shown. The party 110 has its own dataset 112, and the party 120 has its own dataset 122. In an MPC operation, two parties expect to perform a specified operation while ensuring the data security of their respective datasets.

Each dataset in the dataset 112 and the dataset 122 may include one or more data entries, each of which comprises identification information and feature information. The identification information of each data entry may include identifiers (ID) corresponding to one or more identification types, and the feature information may include features corresponding to one or more feature types. The identification information section is used to identify or differentiate the feature information section. For example, for a dataset that records advertising placement, types of identification information may include an advertising placement platform identification and an advertising placement user identification, while types of feature information may include whether an advertisement has been clicked on, duration of time an advertisement has been watched, and whether an advertisement has been added to favorites.

In some implementations, the identification information of the dataset 112 and the dataset 122 may include one or more identical identification types, for example both include the advertising placement platform identification and the advertising placement user identification. In some implementations, the feature information of the dataset 112 and the dataset 122 may include one or more identical feature types or may include completely different feature types.

In FIG. 1, either the party 110 or the party 120 may correspond to any type of one or more electronic devices with computing capabilities, including terminal devices or server devices. The terminal device may be any type of mobile terminal, fixed terminal or portable terminal, including a mobile phone, a desktop computer, a laptop computer, a notebook computer, a netbook computer, a tablet computer, a media computer, a multimedia tablet, a personal communication system (PCS) device, a personal navigation device, a personal digital assistant (PDA), an audio/video player, a digital camera/camera, a positioning device, a television receiver, a radio broadcasting receiver, an e-book device, a gaming device, or any combination thereof, including accessories and peripherals of these devices or any combination thereof. For example, the server device may include a computing system/server, such as a mainframe, an edge computing node, a computing device in a cloud environment, and so on.

It should be understood that the description of the structure and functionality of the environment 100 is only for purpose of illustration and does not imply any limitations on the scope of the present disclosure. For example, although it is not shown in FIG. 1, in some cases, MPC operations may also involve more parties, each of which may have its own dataset.

In an MPC operation, it is sometimes necessary to determine intersection matching between datasets of multiple parties. For example, multiple parties each input a dataset and determine the intersection of multiple datasets without compromising the intersection of both parties. The intersection here refers to data entries that match the identification information in two datasets. In some implementations, the combination of different feature information indexed by a same identifier in two datasets may be determined through the intersection matching. In some implementations, in a case that matched identification information is obtained, a password share of feature information of data entries in the intersection may also be generated for a subsequent MPC operation.

In some intersection matching schemes, an anonymous identity (ID) of a union of both parties is generated based on the ECDH technology, and an intersection part of both parties may be mapped to a same anonymous ID. Afterwards, the both parties perform the MPC protocol through the anonymous ID to complete a subsequent computation. However, the result generated by this type of protocol is a union of both parties. When the amount of data on both parties is unbalanced, the scale of the union is large, but the scale of an intersection part with actual meaning is very few, it may result in significant additional costs for a subsequent MPC computing protocol.

In other schemes, an intersection ID of both parties is matched in the form of secret share based on the MPC protocol, and a secret share with features of both parties is generated at the same time. However, such schemes have a high requirement for communication conditions and are difficult to achieve multi-ID matching. Moreover, when a dataset contains duplicate IDs, the computational cost is relatively high.

Currently, it is expected to provide an intersection matching scheme that is efficient in communication and computation, and can ensure the security of intersection information.

According to the example embodiments of the present disclosure, an improved scheme for data processing is provided. This scheme is based on a secure permutation protocol, also referred to as an oblivious permutation protocol. According to the scheme, for the first party with the first dataset and the second party with the second dataset in MPC, the first party obtains first double-encrypted identification information and a first feature share and a second feature share of first feature information of respective data entries in a first dataset of the first party, and second feature information and a third feature share of second feature information of respective data entries in a second dataset of the second party. The first party determines a first intersection of the first dataset and the second dataset by matching the first double-encrypted identification information with the second double-encrypted identification information, data entries in the first intersection comprising matched identification information, and the second feature share of the first feature information and the third feature share of the second feature information identified by the identification information. Then, the first party performs, using the first feature share of the first feature information, a first round of secure permutation on the first feature information with the second party, to obtain a first target feature share of the first feature information; and performs, using the third feature share of the second feature information, a second round of secure permutation on the second feature information with the second party, to obtain a first target feature share of the second feature information. The first party updates the first intersection based on the first target feature share of the first feature information and the first target feature share of the second feature information; and performs the MPC with the second party based on the updated first intersection.

According to the embodiment of the present disclosure, a feature share (that is, a secret share) of an intersection feature of data from both parties is generated without exposing the intersection through the secure permutation technology. This scheme significantly improves the efficiency of intersection matching.

The following will continue to refer to the accompanying drawings to describe some example embodiments of the present disclosure.

Figure 2:
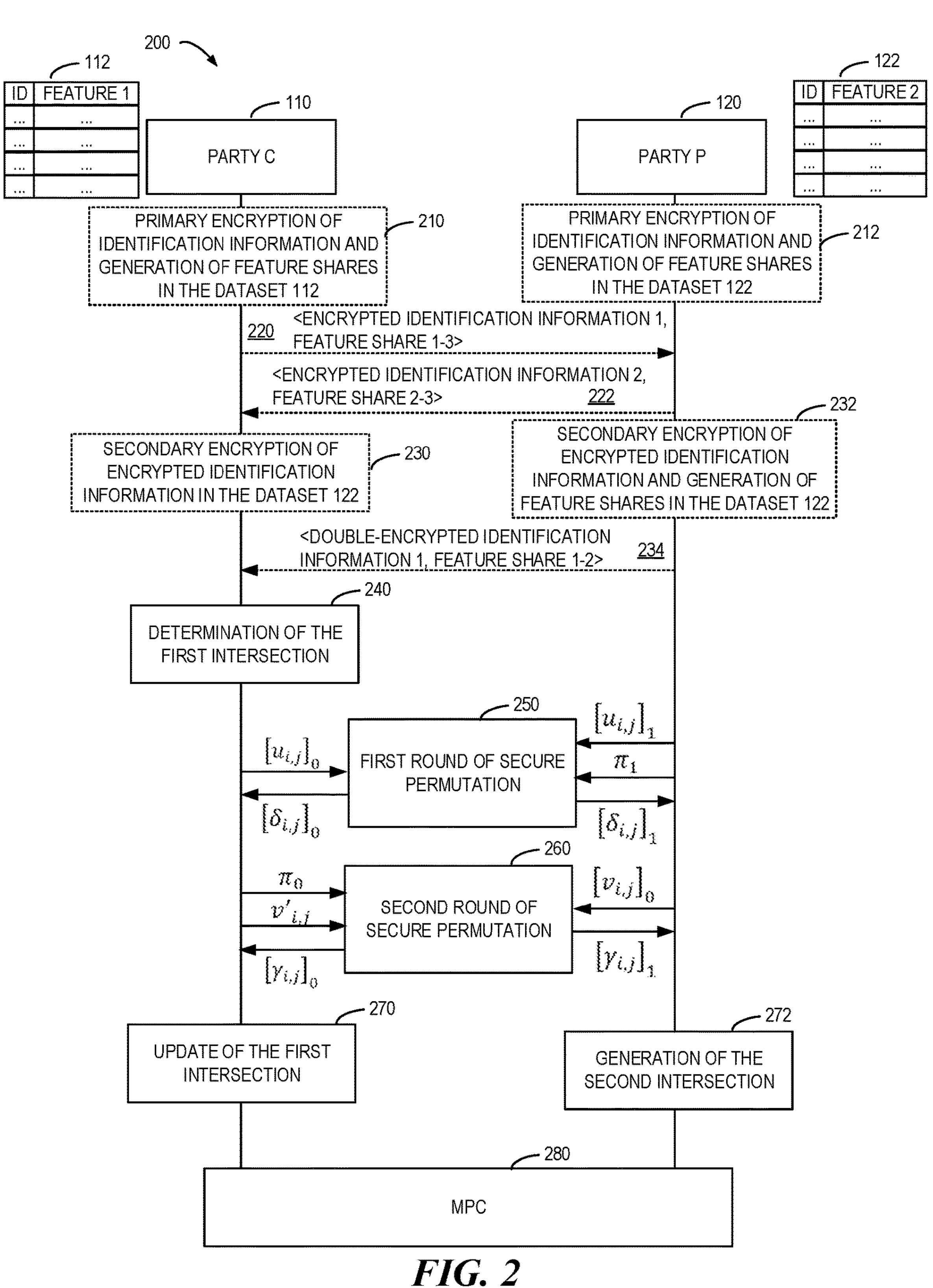
FIG. 2 shows a flowchart of a multi-party signaling flow for data processing according to some embodiments of the present disclosure.

FIG. 2 shows a flowchart of a multi-party signaling flow 200 for data processing according to some embodiments of the present disclosure. For the convenience of discussion, the signaling flow 200 will be described with reference to the environment 100 of FIG. 1. The signaling flow 200 related to the party 110 with the dataset 112 and the party 120 with the dataset 122.

Assuming that data entries in the dataset 112 and the dataset 122 all include one or more types of identification information; the dataset 112 comprises $n_c$ data entries, each of which comprises me features; the dataset 122 comprises $n_p$ data entries, each of which comprises $m_p$ features. The dataset 112 may be represented as $$\{(Cid_i, u_{i,0}, \ldots, u_{i,m_c})\}_{i\in[n_c]}$$

(a range $[0, n_c)$ is represented in a form of $[n_c]$, same below), where $Cid_i$ refers to the identification information of the $i^{th}$ data entry, $u_{i,0}$ refers to a feature 0 of the $i^{th}$ data entry, and $u_{i,m_c}$ refers to a feature $m_c$ of the $i^{th}$ data entry. Similarly, the dataset 122 may be represented as $$\{(Pid_i, v_{i,0}, \ldots, v_{i,m_p})\}_{i\in[n_p]}.$$

In the signaling flow 200, the party 110 and the party 120 obtain information required for subsequent secure permutation respectively. Specifically, the party 110 obtains double-encrypted identification information $\widetilde{Cid}_i$ and a first feature share $[u_{i,j}]_0$ and a second feature share $u''_{i,j}$ of feature information $u_{i,j}$ of respective data entries in the dataset 112, and double-encrypted identification information $\widetilde{Pid}_i$ and a first feature share $v'_{i,j}$ of feature information $v_{i,j}$ of respective data entries in the dataset 122 of the party 120. The party 120 obtains a fourth feature share $[u_{i,j}]_1$ of first feature information $u_{i,j}$ for respective data entries in the dataset 112 of the party 110 and first permutation information $\pi_1$ for the dataset 112, and a first feature share $[v_{i,j}]_0$ of the feature information $v_{i,j}$ for respective data entries in the dataset 122 of the party 120.

In some embodiments, the party 110 initially has its own original dataset 112, while the party 120 initially has its own original dataset 122. The party 110 and the party 120 may exchange information by encrypting the identification information and generating a secret share of the feature information. Considering the encryption needs, during an initialization stage, the party 110 and the party 120 may determine an encryption method and a key to use, respectively.

In some embodiments, the identification information in the dataset 112 and the dataset 122 may be realized based on the Elliptic Curve encryption algorithm, and the party 110 and the party 120 may realize a key exchange through the Elliptic Curve Key Exchange. For example, the party 110 may randomly select an elliptic curve encryption key $r_c$; and the party 120 may randomly select an elliptic curve encryption key $r_p$. In other embodiments, the encryption of the identification information may also be based on any other appropriate encryption algorithm, as long as the party 110 and the party 120 choose a key used to encrypt the identification information respectively.

In some embodiments, the party 110 and the party 120 may first synchronize data size of the dataset 112 and the dataset 122. If the number of data entries in the dataset 112 is not equal to the number of data entries in the dataset 122 (that is, $n_c \neq n_p$), then the party 110 and/or the party 120 need to fill the dataset. This is because a secure permutation protocol will be used subsequently, and the secure permutation protocol cannot change the data size. Therefore, in the initial stage, it is required that both parties have a same data size. In some embodiments, the party 110 and/or the party 120 may use random identification information and use 0 as the feature information to fill in the dataset 112 and/or the dataset 122. In some embodiments, the filled random identification information may differ from true identification information in the dataset 112 or the dataset 122. For example, the random identification information may be selected from a large range to ensure that a probability of an appearance of the same identification information is negligible. In some embodiments, after filling, both the dataset 112 and the dataset 122 may contain $\max(n_c' n_p)$ data entries. For the convenience of discussion, a situation with $n_c = n_p = \max(n_c' n_p)$ is assumed in subsequent steps.

After the initialization stage and the determination of the encryption method, the party 110 and the party 120 may perform encryption of the identification information and generation and exchange of the feature share of the feature information for respective datasets. The party 110 may perform primary encryption on the identification information and generate the feature share (210) for the feature information for respective data entries in their dataset 112, to obtain encrypted identification information and the third feature share for the feature information (marked as "encrypted identification information 1" and "feature share 1-3" in FIG. 2, respectively). The party 120 may perform the primary encryption on the identification of respective data entries in their dataset 122 and generate the feature share of the feature information (212), to obtain the encrypted identification information and the third feature share of the feature information (marked as "encrypted identification information 2" and "feature share 2-3" in FIG. 2, respectively).

In some embodiments, the encryption of the identification information and feature share generation of the feature information may be triggered by either party. In some embodiments, if the party 120 is a client that can be called multiple times and the party 110 is a server side, a request may be firstly initiated by the party 120. In some embodiments, after receiving the request, the party 110 may determine whether to fill in a pseudo data entry in the dataset 112 according to the size of the dataset 122 of a client 120 (that is, the number of data entries). It should be understood that the party 110 and the party 120 may correspond to different entities in different application scenarios, and their intersection matching may be triggered based on any reason, by either party, or through negotiation between both parties.

In some embodiments, before the encryption, the party 110 may perform disorder processing on respective data entries in the dataset 112. Alternatively, or in addition, the party 120 may perform disorder processing on respective data entries in the dataset 122.

In some embodiments, when encrypting the identification information, the party 110 may use a first encryption key, for example an elliptic curve encryption key $r_c$, to encrypt the identification information of respective data entries in the dataset 112, to obtain the encrypted identification information (that is, $Cid'_i=r_c \cdot H(Cid_i)$) of the dataset 112. In this way, the identification information of respective data entries in the dataset 112 is randomized to avoid disclosing the true identification information to other parties. Similarly, the party 120 may use a second encryption key, for example an elliptic curve encryption key $r_p$, to encrypt the identification information $Pid_i$ of respective data entries in the dataset 122, to obtain the encrypted identification information (that is, $Pid'_i=r_p \cdot H(Pid_i)$) of the dataset 122. In this way, the identification information of respective data entries in the dataset 122 is randomized to avoid disclosing the true identification information to other parties. In the encryption process, H: $\{0,1\}^* \rightarrow \mathbb{G}$ is a hash function that maps any input to an elliptic curve point. Certainly, as mentioned above, the encryption of the identification information may also be based on any other appropriate encryption algorithm.

When generating the feature share (also known as secret share) of the feature information the party 110 may randomly generate the first feature share $$\{[u_{i,j}]_0\}_{i\in[n_c],j\in[m_c]}$$

of the feature information $u_{i,j}$ of its own dataset 112. The party 110 generates the third feature share $u'_{i,j}$ of the feature information $u_{i,j}$ based on the first feature share. For example, the party 110 subtracts the first feature share $[u_{i,j}]_0$ from the feature information $u_{i,j}$ of the dataset 112 to obtain the third feature share, that is $u'_{i,j}=u_{i,j}-[u_{i,j}]_0$.

Similarly, the party 120 may randomly generate the first feature share $$\{[v_{i,j}]_0\}_{i\in[n_p],j\in[m_p]}$$

of the feature information $v_{i,j}$ in its own dataset 122. The party 110 generates the third feature share $v'_{i,j}$ of the feature information $v_{i,j}$ based on the first feature share. For example, the party 120 subtracts the first feature share $[v_{i,j}]_0$ from the feature information $v_{i,j}$ of the dataset 122 to obtain the third feature share, that is $V'_{i,j}=v_{i,j}-[v_{i,j}]_0$.

The party 110 sends (220) the encrypted identification information and the third feature share $$\{(Cid'_i, u'_{i,j})\}_{i\in[n_c],j\in[m_c]}$$

of the feature information of the dataset 112 to the party 120. The party 120 sends (222) the encrypted identification information and the third feature share $$\{(Pid'_i, v'_{i,j})\}_{i\in[n_p],j\in[m_p]}$$

of the feature information of the dataset 122 to the party 110.

Next, the party 110 and the party 120 encrypt the received encrypted identification information of the other party again to obtain the double-encrypted identification information.

In some embodiments, after receiving the encrypted identification information and the third feature share $$\{(Pid'_i, v'_{i,j})\}_{i\in[n_p],j\in[m_p]}$$

of the feature information of the dataset 122, the party 110 performs secondary encryption (230) on the received encrypted identification information $Pid'_i$ of the dataset 122. In some embodiments, when performing the secondary encryption on the encrypted identification information $Pid'_i$, the party 110 may perform, reusing the first encryption key (for example, an elliptic curve encryption key $r_c$ for performing the primary encryption on the identification information in the dataset 112), the secondary encryption on the encrypted identification information $Pid'_i$ in the dataset 122, to obtain the double-encrypted identification information $\widetilde{Pid}_i=r_c r_p \cdot H(Pid_i)$ of the dataset 122.

Similarly, the party 120 performs the secondary encryption and generation of the feature share (232) on the encrypted identification information $Cid'_i$ of the received dataset 112. In some embodiments, when performing the secondary encryption on the encrypted identification information $Cid'_i$, the party 120 may perform, reusing the second encryption key (for example, an elliptic curve encryption key $r_p$ for performing the primary encryption on the identification information in the dataset 122), the secondary encryption on the encrypted identification information $Cid'_i$ in the dataset 112, to obtain the double-encrypted identification information $\widetilde{Cid}_i=r_p r_c \cdot H(Cid_i)$ of the dataset 122.

In addition, the party 120 randomly generates a fourth feature share $$\{[u_{i,j}]_1\}_{i\in[n_c],j\in[m_c]}$$

of the feature information $u_{i,j}$ of the dataset 112, and generates, based on the third feature share $$\{u'_{i,j}\}_{i\in[n_c],j\in[m_c]}$$

of the feature information and the generated fourth feature share $$\{[u_{i,j}]_1\}_{i\in[n_c],j\in[m_c]}$$

of the received dataset 112, a second feature share ($u''_{i,j}$) of the feature information $u_{i,j}$ of the dataset 112, for example subtracting the feature share $[u_{i,j}]_1$ from $u'_{i,j}$, to obtain the second feature share $u''_{i,j}=u'_{i,j}-[u_{i,j}]_1$. The party 120 randomly generates the first permutation information $\pi_1$, which may be a random permutation vector in a range of $[0, n_c)$ for disrupting a correspondence $$\left(\text{that is, } \pi_1\left(\left\{\left(\widetilde{Cid_i}, u''_{i,j}\right)\right\}_{i\in[n_c],j\in[m_c]}\right)\right)$$

between the double-encrypted identification information $\widetilde{Cid_i}$ and the second feature share $u''_{i,j}$ of the dataset 112. In this way, the correspondence between the double-encrypted identification information $\widetilde{Cid_i}$ and the second feature share $u''_{i,j}$ of the dataset 112 is permutated. The party 112 sends (234) the double-encrypted identification information $\widetilde{Cid_i}$ and the second feature share $u''_{i,j}$ (represented as <double-encrypted identification information 1, feature share 1-2> in the figure) to the party 110.

In this way, the party 110 obtains the double-encrypted identification information $\widetilde{Cid_i}$ of the dataset 112 and the double-encrypted identification information $\widetilde{Pid_i}$ of the dataset 122. Next, the party 110 performs intersection matching according to the double-encrypted identification information of data of both parties, to obtain the necessary permutation to align the datasets of both parties (that is, data entries in the intersection are in the same position). For example, the party 110 determines (240) the first intersection of the dataset 112 and the dataset 122 by matching the double-encrypted identification information $\widetilde{Cid_i}$ of the dataset 112 and the double-encrypted identification information $\widetilde{Pid_i}$ of the dataset 122. In the embodiments of the present disclosure, the intersection of two datasets refers to finding data entries with matched (or identical) identification information in the two datasets. The data entries in the first intersection comprise matched identification information, and the second feature share ($u''_{i,j}$) of the feature information $u_{i,j}$ and the third feature share $v'_{i,j}$ of the feature information $v_{i,j}$ identified by the identification information.

The party 110 determines which data entries in the dataset 112 and the dataset 122 have matched identification information based on a matching result between the double-encrypted identification information $$\{\widetilde{Cid_i}\}_{i\in[n_c]}$$

of the dataset 112 and the double-encrypted identification information $$\{\widetilde{Pid_i}\}_{i\in[n_p]}$$

of the dataset 122. As mentioned above, the double-encrypted identification information $\widetilde{Cid_i}$ of the dataset 112 is encrypted by the party 110 using the first encryption key $r_c$ and the party 120 using the second encryption key $r_p$, respectively, that is $\widetilde{Cid_i}=r_p r_c\cdot H(Cid_i)$, however the double-encrypted identification information $\widetilde{Pid_i}$ of the dataset 122 is encrypted by the party 120 using the second encryption key $r_p$ and the party 110 using the first encryption key $r_c$, respectively, that is $\widetilde{Pid_i}=r_c r_p\cdot H(Pid_i)$. If the identification information of a data entry in the dataset 112 matches the identification information of a data entry in the dataset 122, then after encryption by two keys $r_c$ and $r_p$, the identification information of these two data entries still matches. Therefore, whether the identification information is matched or not may be performed by the party 110 without disclosing the actual identification information.

It should be noted that although the data entries in the first intersection include matched identification information and the second feature share ($u''_{i,j}$) of the feature information $u_{i,j}$ and the third feature share ($v'_{i,j}$) of the feature information $v_{i,j}$, identified by the identification information, considering that the party 120 performed one disturbance before sending the double-encrypted identification information $\widetilde{Cid_i}$ and the second feature share $u''_{i,j}$ of the dataset 112 to the party 110, the correspondence between the second feature share $u''_{i,j}$ and the identification information may be inaccurate. Therefore, the party 110 and the party 120 will call the secure permutation protocol to adjust the feature share of the dataset 112 and the feature share of the dataset 122.

Figure 3:
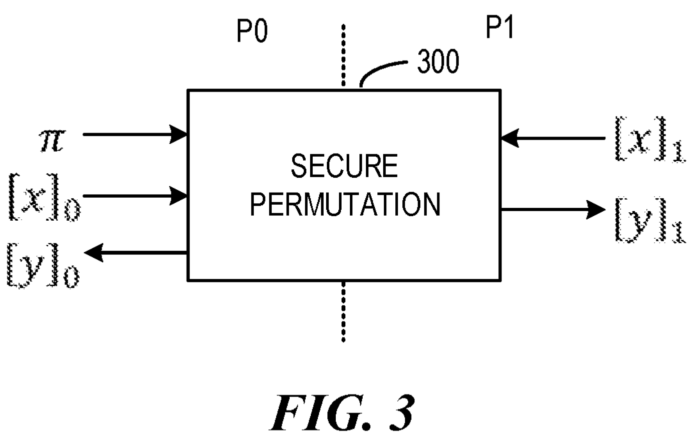
FIG. 3 shows a schematic diagram of an example of secure permutation according to some embodiments of the present disclosure.

Here, for ease of understanding, basic concepts and implementation methods of the secure permutation protocol are briefly introduced with reference to FIG. 3. Main functions of a secure permutation protocol 300 are shown in the figure, where P0 inputs permutation $\pi$ and a share $[x]_0$ of the dataset and P1 inputs another share $[x]_1$ of the dataset. The output results are shares $[y]_0$ and $[y]_1$ of the dataset after permutation, which meet $\pi([x]_0+[x]_1)=[y]_0+[y]_1$. There are multiple implementations of the secure permutation protocol, and a typical three-party implementation is used as an example in the present disclosure. The three parties P0, P1, and P2 perform the following steps without collusion:

Initialization stage: assuming that the data length is n, a third party P2 first generates random vectors $\tilde{x}$, $u_0$, $u_1$ and random permutation information $\tilde{\pi}$ in a range of $[0, n)$, satisfying $\tilde{\pi}(\tilde{x})=u_0+u_1$. P2 will send $\tilde{\pi}$, $u_0$ to P0 and $\tilde{x}$, $u_1$ to P1.

Online performing stage: P0 input $\pi$, $[x]_0$, P1 input $[x]_1$;

P0 calculates $\pi\cdot\tilde{\pi}^{-1}$ and sends it to P1; P1 calculates $[x]_1-\tilde{x}$ and sends it to P0;

P0 calculates $[y]_0=(\pi([x]_1-\tilde{x})+\pi\cdot\tilde{\pi}^{-1}(u_0))+\pi([x]_0)$;

P1 calculates $[y]_1=\pi\cdot\tilde{\pi}^{-1}(u_1)$.

The above processes may verify the correctness, that is $[y]_0+[y]_1=\pi([x]_0+[x]_1)$.

In addition to the above implementations, for example, HE technology may be used to implement the secure permutation protocol of both parties:

P1 encrypts $\widetilde{[x]}_1=\mathrm{Enc}([x]_1)$ using HE technology and sends it to P0;

P0 calculates $\tilde{x}=\mathrm{Add}(\widetilde{[x]}_1, [x]_0)$ using homomorphic addition;

P0 processes $\tilde{x}$ using permutation information $\pi$ to obtain $\tilde{y}=\pi(\tilde{x})$;

P0 generates a random feature share $[y]_0$, calculates $\widetilde{[y]}_1$=Add($\tilde{y}$, $-[y]_0$), and sends it to P1;

P1 decrypts $[y]_1$=Dec($\widetilde{[y]}_1$).

Next, continuing with reference to FIG. 2, the party 110 and the party 120 perform a first round of secure permutation (250) for the feature information of the dataset 112. In the first round of secure permutation, the party 110 owns the first feature share $$\{[u_{i,j}]_0\}_{i\in[n_c],j\in[m_c]}$$

of the feature information $u_{i,j}$ of the dataset 112, and the party 120 owns the fourth feature share $$\{[u_{i,j}]_1\}_{i\in[n_c],j\in[m_c]}$$

and the first permutation information $\pi_1$ of the feature information $u_{i,j}$ of the dataset 112. In the first round of secure permutation, the party 110 is equivalent to P1 in the secure permutation protocol, and the party 120 is equivalent to P0 in the secure permutation protocol. By calling the first round of secure permutation protocol, the feature share of the dataset 112 in the first intersection may be adjusted to obtain the feature share of the dataset 112 sequentially aligned with the intersection.

In some embodiments, the party 110 inputs $$\{[u_{i,j}]_0\}_{i\in[n_c],j\in[m_c]}$$

and the party 120 inputs $$\{[u_{i,j}]_1\}_{i\in[n_c],j\in[m_c]}$$

and $\pi_1$ with the assistance of the third party P2, or by using the HE technology. After the secure permutation, the party 110 obtains the first target feature share $$\{[\delta_{i,j}]_0\}_{i\in[n_c],j\in[m_c]}$$

of the feature information $u_{i,j}$ of the dataset 112; the party 120 obtains a second target feature share $$\{[\delta_{i,j}]_1\}_{i\in[n_c],j\in[m_c]}$$

of the feature information $u_{i,j}$ of the dataset 112. The first target feature share and the second target feature share of the feature information $u_{i,j}$ satisfy $$\pi_1\left(\{[u_{i,j}]_0+[u_{i,j}]_1\}_{i\in[n_c],j\in[m_c]}\right)=\left\{[\delta_{i,j}]_0+\delta_{i,j}\right]_1\Big\}_{i\in[n_c],j\in[m_c]}.$$

Then, the party 110 may use the first target feature share $$\{[\delta_{i,j}]_0\}_{i\in[n_c],j\in[m_c]}$$

of the feature information $u_{i,j}$ and the second feature share $$\{u''_{i,j}\}_{i\in[n_c],j\in[m_c]}$$

of the feature information $u_{i,j}$ received from the party 120 to calculate $[\delta_{i,j}]_2=[\delta_{i,j}]_0+u''_{i,j}$. It may be proven that, $[\delta_{i,j}]_1+[\delta_{i,j}]_2$ is equal to the feature information corresponding to the real data entries in the dataset 112.

Furthermore, the party 110 and the party 120 perform a second round of secure permutation (260) for the feature information of the dataset 122. In the second round of secure permutation, the party 110 owns the third feature share $$\{v'_{i,j}\}_{i\in[n_p],j\in[m_p]}$$

of the feature information $v_{i,j}$ of the dataset 122, and the party 120 owns the first feature share $$\{[v_{i,j}]_0\}_{i\in[n_p],j\in[m_p]}$$

of the feature information $v_{i,j}$ of the dataset 122.

In some embodiments, the party 110 also generates second permutation information $\pi_0$ required to align (that is, data entries of the intersection are in the same position) the datasets of both parties by matching the double-encrypted identification $\widetilde{Cid}_i$ of the dataset 112 and the double-encrypted identification information $\widetilde{Pid}_i$ of the dataset 122. Firstly, the party 110 holds the double-encrypted identification information $$\{\widetilde{Cid}_i\}_{i\in[n_c]}$$

of the dataset 112 and the double-encrypted identification information $$\{\widetilde{Pid}_i\}_{i\in[n_p]}$$

of the dataset 122. The party 110 uses the double-encrypted identification information $$\{\widetilde{Pid}_i\}_{i\in[n_p]}$$

to match $$\{\widetilde{Cid}_i\}_{i\in[n_c]},$$

to generate the second permutation information $\pi_0$ corresponding to the encrypted identification information $Pid'_i$ of the party 120.

In some embodiments, firstly, the party 110 initializes a permutation vector $\pi_0=\{-1\}^{n_p}$, $\varphi=\{0, 1, \ldots n_p-1\}$ of length $n_p$. The party 110 traverses the double-encrypted identification information $$\{\widetilde{Pid}_i\}_{i\in[n_p]}.$$

If the identification information (that is, the double-encrypted identification information) of the first data entry in the dataset 112 and the identification information of the second data entry in the dataset 122 are determined to be matched through matching, the generated second permutation information ($\pi_0$) comprises an index of the position of the first data entry or the second data entry. If the identification information of the first data entry and the second data entry are mismatched based on matching, the second permutation information ($\pi_0$) is generated to include the pseudo index. For example, for each $\widetilde{Pid}_i$, if $\widetilde{Cid}_k=\widetilde{Pid}_i$ exists, let $\pi_0[i]=k$ and remove k from $\varphi$, that is $\varphi=\varphi-\{k\}$. Otherwise, the party 110 randomly selects an element k' from $\varphi$, let $\pi_0[i]=k'$, and $\varphi=\varphi-\{k'\}$. In this process, the party 110 will record which locations are true intersections for setting a true intersection identification list in subsequent steps. After the traversal, the party 110 generates the second permutation information $\pi_0$.

In this way, in the second round of secure permutation, the party 110 owns the third feature share $$\{v'_{i,j}\}_{i\in[n_p],j\in[m_p]}$$

of the feature information $v_{i,j}$ and the second permutation information $\pi_0$ of the dataset 122. In the second round of secure permutation, the party 110 is equivalent to P0 in the secure permutation protocol, and the party 120 is equivalent to P2 in the secure permutation protocol. By calling the second round of secure permutation protocol, the feature share of the dataset 122 in the first intersection may be adjusted to obtain the feature share of the dataset 122 sequentially aligned with the intersection.

In some embodiments, the party 120 inputs $$\{v'_{i,j}\}_{i\in[n_p],j\in[m_p]}$$

and $\pi_0$, and the party 120 inputs $$\{[v_{i,j}]_0\}_{i\in[n_p],j\in[m_p]}$$

with the assistance of the third party P2 or by using the HE technology. After the secure permutation, the party 110 obtains the first target feature share $$\{[\gamma_{i,j}]_0\}_{i\in[n_p],j\in[m_p]}$$

of the feature information $v_{i,j}$ of the dataset 122; the party 120 obtains the second target feature share $$\{[\gamma_{i,j}]_1\}_{i\in[n_p],j\in[m_p]}$$

of the feature information $v_{i,j}$ from the dataset 122. The first target feature share and the second target feature share of the feature information $v_{i,j}$ satisfy $$\pi_0\left(\{v'_{i,j}+[v_{i,j}]_0\}_{i\in[n_p],j\in[m_p]}\right)=\{[\gamma_{i,j}]_0+\gamma_{i,j}]_1\}_{i\in[n_p],j\in[m_p]}.$$

It may be proven that $[\gamma_{i,j}]_0+[\gamma_{i,j}]_1$ is equal to the feature information corresponding to areal data entry in the dataset 122.

After the first round of secure permutation and the second round of secure permutation, the party 110 updates (270) the first intersection based on the obtained first target feature share $[\delta_{i,j}]_0$ of the feature information of the dataset 112 and the obtained first target feature share $[\gamma_{i,j}]_0$ of the feature information $v_{i,j}$ of the dataset 122. In some embodiments, in the updated first intersection, the second feature share $u''_{i,j}$ of the feature information $u_{i,j}$ in the dataset 112 is updated as the sum of the second feature share $u''_{i,j}$ and the first target feature share $[\delta_{i,j}]_0$ of the feature information $u_{i,j}$, that is, $[\delta_{i,j}]_2=[\delta_{i,j}]_0+u''_{i,j}$. In the updated first intersection, the third feature share $v'_{i,j}$ of the feature information $v_{i,j}$ in the dataset 122 is updated as the first target feature share $[\gamma_{i,j}]_0$ of the feature information $v_{i,j}$. The party 110 may concatenate $[\delta_{i,j}]_2$ and $[\gamma_{i,j}]_0$ by row, to obtain the updated first intersection.

In some embodiments, the party 110 also sets matching flags for respective data entries in the updated first intersection, where a matching flag for data entries with matched double-encrypted identification information is set to a first value indicating a true match of the identification information, and a matching flag for data entries with mismatched double-encrypted identification information is set to a second value indicating a pseudo match of the identification information. The setting of a matching flag may be based on a matching situation recorded when generating the second permutation information $\pi_0$. In some embodiments, the first value may be set to 1, and the second value may be set to 0.

For example, the party 110 may set an additional matching flag list in the updated first intersection, which records matching flags (also known as is-real flag bit) of corresponding data entries for identifying whether a data entry is a true intersection or a falsely filled intersection. The party 110 may set the is_real flag bit of the true matched intersection to 1 and set the is_real flag bit of the falsely matched intersection to 0 based on the actual filling situation.

At the party 120 side, after the first round of secure permutation and the second round of secure permutation, the party 120 generates (272) a second intersection of the dataset 112 and the dataset 122 based on the second target feature share $[\delta_{i,j}]_1$ of the feature information $u_{i,j}$ of the dataset 112 and the first target feature share $[\gamma_{i,j}]_0$ of the feature information $v_{i,j}$ of the dataset 122. For example, the party 120 concatenates $[\delta_{i,j}]_1$ and $[\gamma_{i,j}]_1$ by row, to obtain the second intersection. Data entries in the second intersection comprise no identification information, and the second target feature share $[\delta_{i,j}]_1$ of the feature information $u_{i,j}$ corresponds to the first target feature share $[\gamma_{i,j}]_0$ of the feature information $v_{i,j}$ sequentially in a granularity of data entries.

At the party 120, the party 120 similarly sets matching flags for the second intersection. Because the party 120 cannot determine whether the identification information of data entries in the second intersection is matched, the party 120 may set the matching flags of all data entries to indicate a pseudo match of the identification information, that is, is_real flag bits are all set to indicate mismatched, for example, all set to 0.

Then, the party 110 performs (280) the MPC of the dataset 112 and the dataset 122 based on the updated first intersection, and the party 120 performs (280) the MPC of the dataset 112 and the dataset 122 based on the updated second intersection.

Because data entries in the first intersection and the second intersection also comprise data entries with mismatched identification information, candidate computation results may be obtained by performing the MPC using the first intersection and the second intersection. The party 110 may determine the target computation result of the MPC based on the determined candidate computation results of each pair of data entries in the first intersection and matching flags for the first intersection. For example, if the matching flag bit of data entries corresponding to the true index in matching flags of the first intersection is set to 1, and the matching flag bit of data entries corresponding to the pseudo index is set to 0, the party 110 may generate the target computation result based on a multiplication operation between the candidate computation results of the data entries in the first intersection and the matching flag of the data entry in the first intersection.

Similarly, the party 120 may determine the target computation result of the MPC based on the determined candidate computation results of data entries in the second intersection and the matching flags for the second intersection. If the matching flags of data entries in the second intersection are set to 0, the party 120 may generate the target computation result based on the multiplication operation between the candidate computation results of data entries in the second intersection and the matching flags of the data entries in the second intersection.

Therefore, although neither the first intersection nor the second intersection is a true intersection result, after the MPC operation, a true intersection operation result may be preserved through a multiplication of the output candidate computation results and the is_real flag bits by calling an MPC multiplication.

Figure 4:
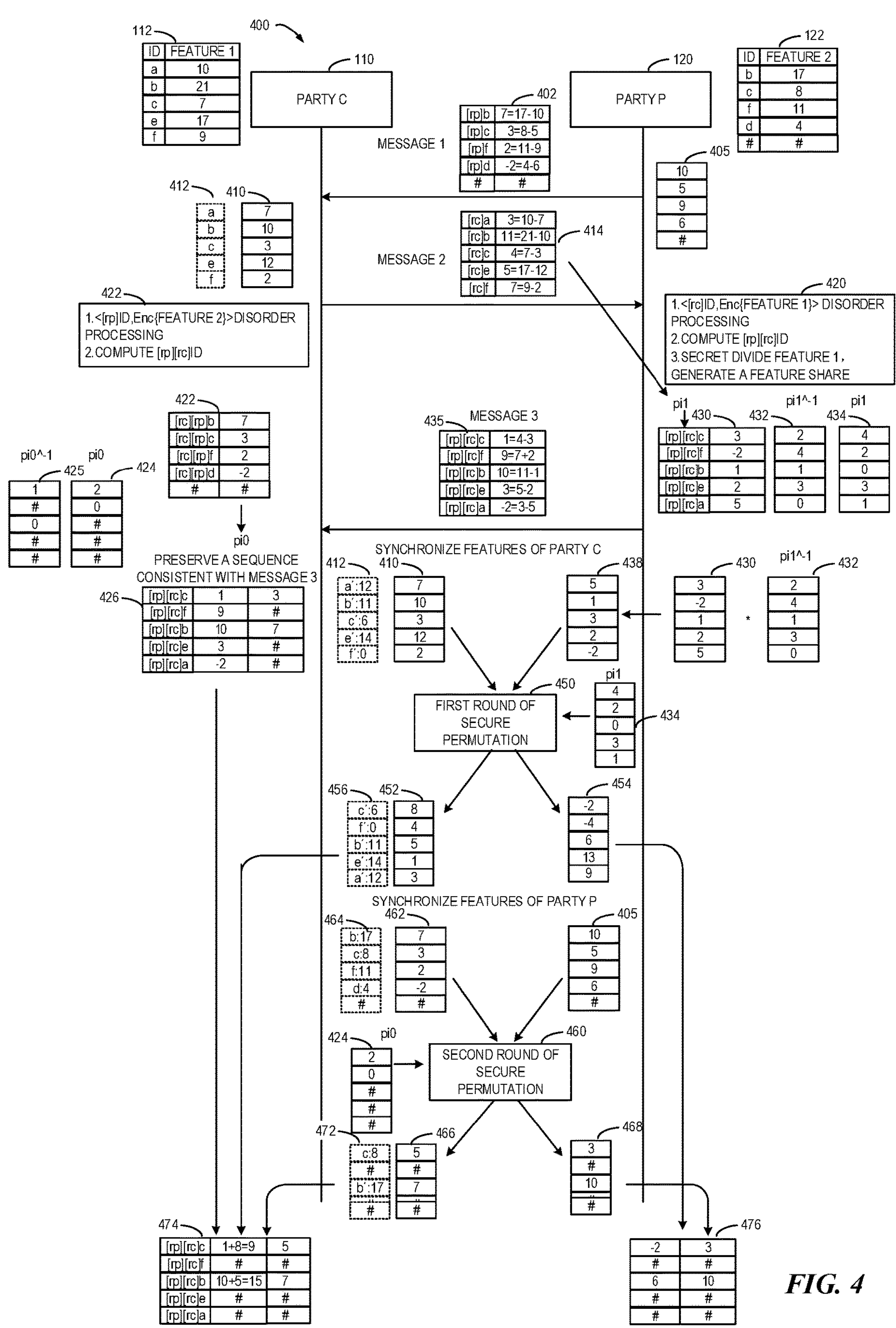
FIG. 4 shows a flowchart of a data processing signaling flow based on an example dataset according to some embodiments of the present disclosure.

For better understanding, FIG. 4 shows a flowchart of a data processing signaling flow 400 based on an example dataset according to some embodiments of the present disclosure. The signaling flow 400 in FIG. 4 may be considered as an example of the signaling flow of FIG. 2. In FIG. 4, a specific example of the dataset 112 and the dataset 122 is provided to describe various encryption and intersection stages. In the example of FIG. 4, it is assumed that the dataset 112 has 5 data entries and the dataset 122 has 4 data entries. In order to align the number of data entries, the dataset 122 is filled with pseudo data entries, represented by #.

As shown in FIG. 4, during a primary encryption stage, the party 120 randomizes the identification information in the dataset 122, that is, performs the primary encryption on the identification information using the second encryption key rp; and generates the first feature share and the third feature share of the feature information. The party 120 sends the encrypted identification information and the third feature share (<[rp]ID, Enc(feature 2)>) 402 of the dataset 122 to the party 110 in message 1. It can be seen that in message 1, the identification information and the feature information in the dataset 122 are encrypted. The party 120 preserves the first feature share 405 of the feature information of the dataset 122.

Similarly, during the primary encryption stage, the party 110 randomizes the identification information in the dataset 112, that is, performs the primary encryption on the identification information using the first encryption key rc; and generates the first feature share and the third feature share of the feature information. The party 110 sends the encrypted identification information and the third feature share (<[rp] ID, Enc(feature 1)>) 414 of the dataset 112 to the party 120 in message 2. It can be seen that in message 2, the identification information and the feature information in the dataset 112 are encrypted. The party 110 preserves a first feature share 410 of the feature information in the dataset 112, and is aware of the correspondence between these first feature share 410 and identification information 412 in its own dataset.

In a secondary encryption stage, the party 120 performs an operation 420, including performing disorder processing on the received encrypted identification information and the third feature share (<[rc]ID, Enc(feature 1)>) of the dataset 112 of the party 110; performing, using the second encryption key rp, the secondary encryption on the encrypted identification information [rc]ID, to obtain the double-encrypted identification information [rp] [rc]ID; and performing secret dividing on the third feature share Enc(feature 1), to obtain the fourth feature share $[u_{i,j}]_1$ and the second feature share $u''_{i,j}$, that is $u''_{i,j}=u'_{i,j}-[u_{i,j}]_1$. The party 120 disrupting, using first permutation information $\pi_1$ 434, a set composed of the double-encrypted identification information and the fourth feature share in the dataset 112, to obtain a disturbed set 430. The party 120 calculates the second feature share $u''_{i,j}$ in the disturbed set 430 and sends a set 435 to the party 110 in message 3. The set 435 comprises the double-encrypted identification information and the second feature share $u''_{i,j}$ of the dataset 112.

Similarly, in the secondary encryption stage, the party 110 performs an operation 415, including performing disorder processing on the received encrypted identification information and the third feature share (<[rp]ID, Enc(feature 2)>) of the dataset 122 of the party 120; performing, using the first encryption key rc, the secondary encryption on the encrypted identification information [rp]ID, to obtain the double-encrypted identification information [rc][rp]ID. In this way, the set 402 received by the party 110 is called a set 422, which comprises the double-encrypted identification information [rc] [rp]ID and third feature share of the dataset 122.

The party 110 determines second permutation information $\pi_0$ 424 by matching the double-encrypted identification information [rp] [rc]ID of the dataset 112 and the double-encrypted identification information [rc] [rp]ID of the dataset 122. The party 110 may also determine a first intersection 426. When determining the first intersection 426, the sequence of data entries in the intersection remains consistent with message 3.

The party 110 and the party 120 perform a first round of secure permutation 450 to synchronize the feature information of the dataset 112 of the party 110. In the first round of secure permutation 450, the party 110 inputs the first feature share 410 of the dataset 112 (which aligns to the identification information 412); the party 120 inputs a fourth feature share 438 and the first permutation information $\pi_1$ 434 of the dataset 112, and the fourth feature share 438 is a feature share that is not disturbed by the first permutation information $\pi_1$ 434. To perform the first round of secure permutation 450, the party 120 may also obtain permutation information 432, for example, from the third party P2.

After the first round of secure permutation 450, the party 110 obtains the first target feature share $[\delta_{i,j}]_0$ 452 of the feature information of the dataset 112, and the party 120 obtains the second target feature share $[\delta_{i,j}]_1$ 454 of the feature information of the dataset 112. The party 110 may determine the correspondence between the first target feature share $[\delta_{i,j}]_0$ 452 of the feature information and identification information 456 of the dataset 112.

Next, the party 110 and the party 120 perform the first round of secure permutation 460 to synchronize the feature information of the dataset 122 of the party 120. In the first round of secure permutation 460, the party 110 inputs the third feature share 462 and the second permutation information $\pi_0$ 424 of the dataset 122; the party 120 inputs the first feature 405 of the dataset 122. The party 110 may obtain the correspondence between the third feature share 462 of the dataset 122 and the identification information 464 of the first intersection. To perform the second round of secure permutation 460, the party 110 may also obtain permutation information 425, for example, from the third party P2.

After the second round of secure permutation 460, the party 110 obtains the first target feature share $[\gamma_{i,j}]_0$ 466 of the feature information of the dataset 122, and the party 120 obtains the second target feature share $[\gamma_{i,j}]_1$ 468 of the feature information of the dataset 122. The party 110 may determine the correspondence between the first target feature share $[\gamma_{i,j}]_0$ 466 of the feature information and identification information 472 in the dataset 122.

The party 110 updates, based on the first target feature share $[\delta_{i,j}]_0$ 452 of the feature information of the dataset 112 and the first target feature share $[\gamma_{i,j}]_0$ 466 of the feature information, the first intersection 426, to obtain an updated first intersection 474. The party 120 generates, based on the second target feature share $[\delta_{i,j}]_1$ 454 of the feature information of the dataset 112 and the second target feature share $[\gamma_{i,j}]_1$ 468 of the feature information of the dataset 122, a second intersection 476.

In addition, the party 110 may also set matching flags (is_real flag bits) for respective data entries in the first intersection 474. The party 120 may also set matching flags (is_real flag bits) for the second intersection 476. The party 110 may set the is_real flag bits of a true intersection to 1, and set the is_real flag bits of a false intersection to 0 according to the actual matching situation of the double identification information. However, the party 120 may set all is_real flag bits to 0. When performing the MPC operation based on the first intersection and the second intersection, a true intersection operation result may be preserved through a multiplication of the candidate computation results of the MPC operation and the is_real flag bits by calling an MPC multiplication.

According to the embodiments of the present disclosure, obtaining the feature share required by the MPC protocol for MPC operations without exposing the true information of both datasets may be supported. By applying the secure permutation technology, the efficiency of the feature share and the intersection matching is improved, and the amount of data to be buffer by both parties is reduced. In some embodiments, the ECDH and the secure permutation protocol are used to achieve efficient computation and communication. Moreover, throughout the entire interaction process, the scale of the intersection may be kept confidential to one of the parties, to ensure data security.

Figure 5:
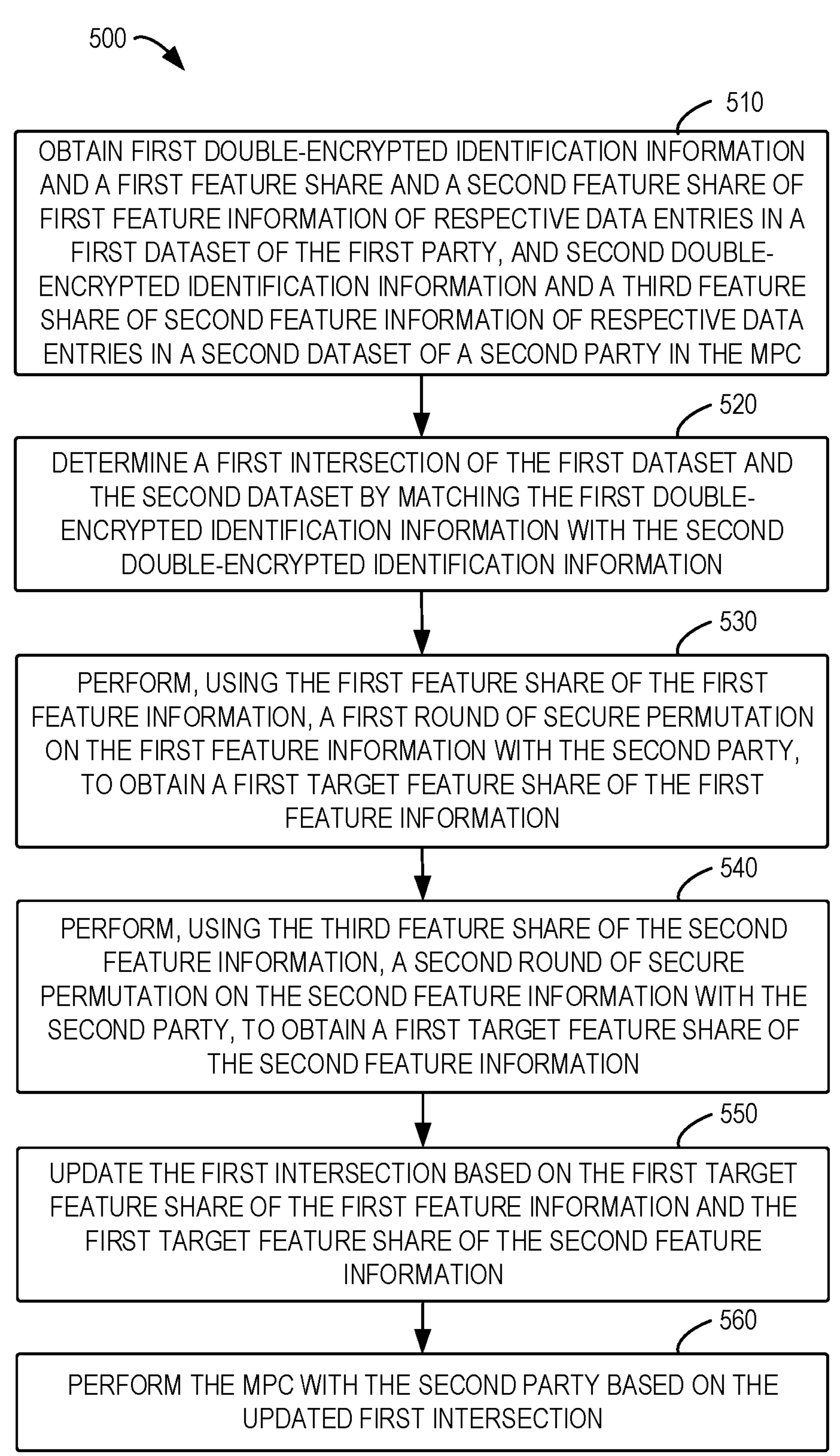
FIG. 5 shows a flowchart of a data processing method implemented at a first party according to some embodiments of the present disclosure.

FIG. 5 shows a flowchart of a data processing method 500 implemented at the first party according to some embodiments of the present disclosure. The method 500 may be implemented as a first party in the MPC, for example the party 110 of FIG. 1. For the convenience of discussion, the method 500 is described with reference to the environment 100 in FIG. 1.

At block 510, the party 110 obtains first double-encrypted identification information and a first feature share and a second feature share of first feature information of respective data entries in a first dataset of the first party, and second double-encrypted identification information and a third feature share of second feature information of respective data entries in a second dataset of a second party in the MPC.

At block 520, the party 110 determines a first intersection of the first dataset and the second dataset by matching the first double-encrypted identification information with the second double-encrypted identification information, data entries in the first intersection comprising matched identification information, and the second feature share of the first feature information and the third feature share of the second feature information identified by the identification information.

At block 530, the party 110 performs, using the first feature share of the first feature information, a first round of secure permutation on the first feature information with the second party, to obtain a first target feature share of the first feature information.

At block 540, the party 110 performs, using the third feature share of the second feature information, a second round of secure permutation on the second feature information with the second party, to obtain a first target feature share of the second feature information.

At block 550, the party 110 updates the first intersection based on the first target feature share of the first feature information and the first target feature share of the second feature information.

At block 560, the party 110 performs the MPC with the second party based on the updated first intersection.

In some embodiments, before obtaining the first double-encrypted identification information and the first feature share of the first feature information, the method 500 further comprises: encrypting first identification information of respective data entries in the first dataset, to obtain first encrypted identification information; generating, based on the first feature share of the first feature information, the third feature share of the first feature information; and sending the first encrypted identification information and the third feature share of the first feature information to the second party for generating and sending, by the second party, the first double-encrypted identification information and the first feature share of the first feature information to the first party.

In some embodiments, encrypting the first identification information comprises: encrypting, using a first encryption key, the first identification information of respective data entries in the first dataset, to obtain the first encrypted identification information. The first double-encrypted identification information is obtained after encrypting the first identification information by the second party using a second encryption key.

In some embodiments, obtaining the second double-encrypted identification information comprises: receiving, from the second party, the second encrypted identification information and the third feature share of the second feature information of respective data entries in the second dataset of the second party, the second encrypted identification information being obtained by encryption by the second party using the second encryption key; and performing, using the first encryption key, the secondary encryption on the second encrypted identification information, to obtain the second double-encrypted identification information.

In some embodiments, obtaining the first double-encrypted identification information and the second feature share of the first feature information comprises: receiving, from the second party, the first double-encrypted identification information and the second feature share of the first feature information, a correspondence between the first double-encrypted identification information and the second feature share of the first feature information being permutated by the second party based on first permutation information.

In some embodiments, at least the first permutation information used by the second party in the first round of secure permutation.

In some embodiments, performing the second round of secure permutation with the second party comprises: generating, based on a matching between the first double-encrypted identification information and the second double-encrypted identification information, second permutation information corresponding to the second encrypted identification information for the second party; and performing, using the second permutation information and the third feature share of the second feature information, the second round of secure permutation with the second party.

In some embodiments, generating the second permutation information comprises: in accordance with a determination that the double-encrypted identification information of a first data entry in the first dataset and a second data entry in the second dataset matches with each other based on the matching, generating the second permutation information to comprise an index of a position of the first data entry or the second data entry; and in accordance with a determination that the double-encrypted identification information of the first data entry and the second data entry mismatches with each other based on the matching, generating the second permutation information to comprise a pseudo index.

In some embodiments, updating the first intersection comprises: updating the first intersection, in the updated first intersection, the second feature share of the first feature information being updated to be a sum of the first target feature share and the second feature share of the first feature information, and the third feature share of the second feature information being updated to be the first target feature share of the second feature information.

In some embodiments, before the first round of secure permutation, the method 500 further comprises: in accordance with a determination that a number of data entries in the first dataset is not equal to a number of data entries in the second dataset, causing the number of data entries in the first dataset equal to the number of data entries in the second dataset by filling in a pseudo data entry.

In some embodiments, the method 500 further comprises: setting matching flags for respective data entries in the updated first intersection, wherein a matching flag for data entries with matched double-encrypted identification information is set to a first value indicating a true match of identification information, a matching flag for data entries with mismatched double-encrypted identification information is set to a second value indicating a pseudo match of identification information.

In some embodiments, performing the MPC comprises: performing the MPC with the second party based on the updated first intersection, to obtain candidate computation results for respective data entries in the updated first intersection; and determining, based on the matching flags for respective data entries in the updated first intersection and the candidate computation results, a target computation result of the MPC.

In some embodiments, the first value is set to 1, the second value is set to 0, and determining the target computation result comprises: generating a target computation result of the MPC based at least on a multiplication operation between the matching flags for respective data entries in the updated first intersection and the candidate computation results.

Figure 6:
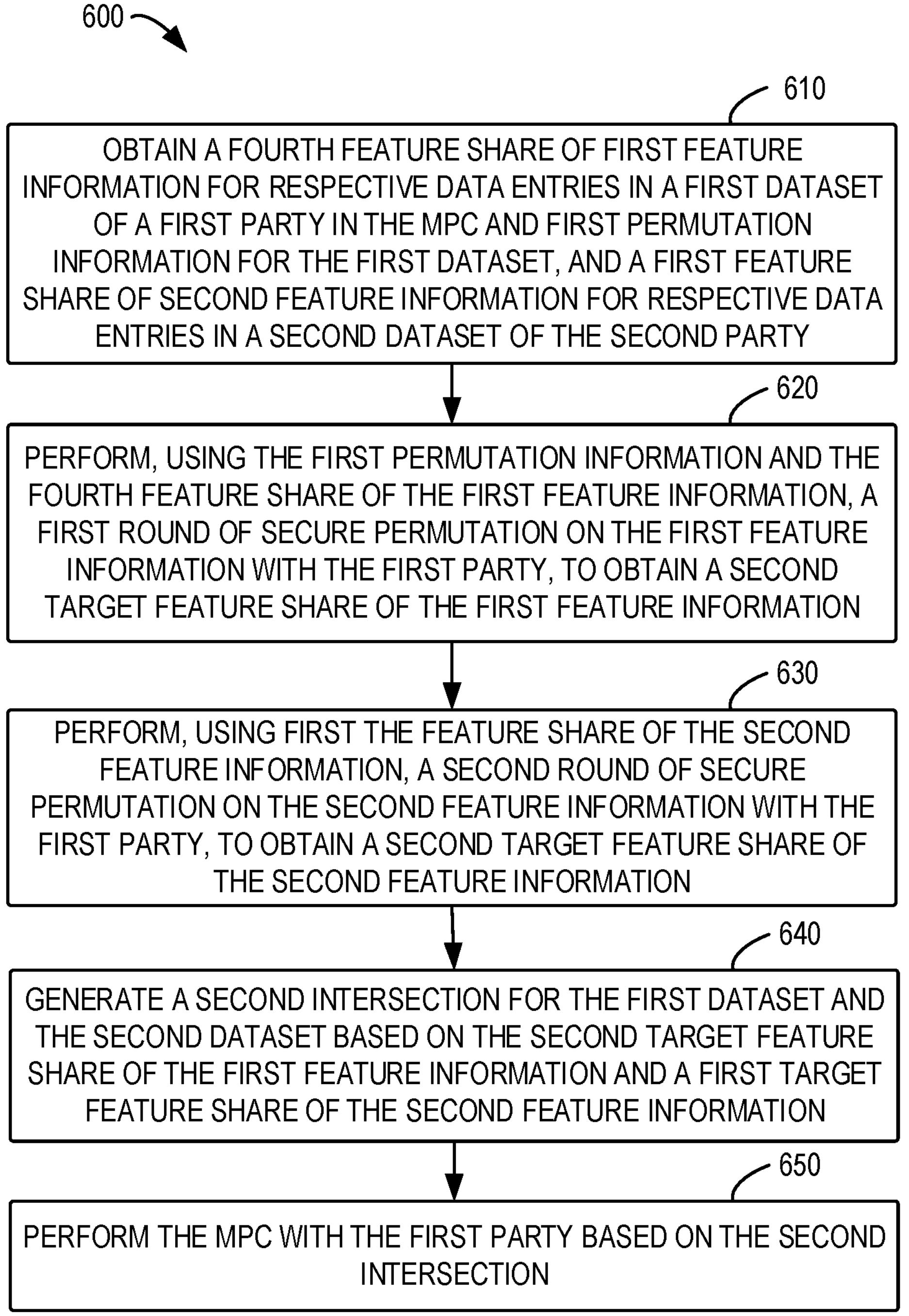
FIG. 6 shows a flowchart of a data processing method implemented at a second party according to some embodiments of the present disclosure.

FIG. 6 shows a flowchart of a data processing method implemented at a second party according to some embodiments of the present disclosure. The method 600 may be implemented, for example, by the party 120 of FIG. 1. For the convenience of discussion, the method 600 is described with reference to the environment 100 of FIG. 1.

At block 610, the party 120 obtains a fourth feature share of first feature information for respective data entries in a first dataset of a first party in the MPC and first permutation information for the first dataset, and a first feature share of second feature information for respective data entries in a second dataset of the second party.

At block 620, the party 120 performs, using the first permutation information and the fourth feature share of the first feature information, a first round of secure permutation on the first feature information with the first party, to obtain a second target feature share of the first feature information.

At block 630, the party 120 performs, using the first feature share of the second feature information, a second round of secure permutation on the second feature information with the first party, to obtain a second target feature share of the second feature information.

At block 640, the party 120 generates a second intersection for the first dataset and the second dataset based on the second target feature share of the first feature information and a first target feature share of the second feature information.

At block 650, the party 120 performs the MPC with the first party based on the second intersection.

In some embodiments, the method 600 further comprises: encrypting second identification information of respective data entries in the second dataset, to obtain second encrypted identification information; generating, based on the first feature share of the second feature information, the third feature share of the second feature information; and sending the second encrypted identification information and the third feature share of the second feature information to the first party for determining and sending, by the first party, the first feature share of the second feature information to the second party.

In some embodiments, before performing the first round of secure permutation, the method 600 further comprises: receiving, from the first party, the first encrypted identification information and a third feature share of the first feature information; performing the secondary encryption on the first encrypted identification information, to obtain the first double-encrypted identification information; generating the second feature share of the first feature information based on the third feature share and the fourth feature share of the first feature information; permutating, using first permutation information, a correspondence between the first double-encrypted identification information and the second feature share of the first feature information; and sending, to the first party, the permutated first double-encrypted identification information and the permutated second feature share of the first feature information.

In some embodiments, the first encrypted identification information is encrypted by the first party using the first encryption key, and performing the secondary encryption comprises encrypting, using the second encryption key, the first identification information, to obtain the first double-encrypted identification information.

In some embodiments, data entries in the second intersection comprise no identification information, and the second target feature share of the first feature information corresponds to the first target feature share of the second feature information sequentially in a granularity of data entries.

In some embodiments, performing the MPC comprises: setting matching flags for respective data entries in the second intersection, the matching flags being set to indicate a pseudo match of identification information; performing the MPC with the first party based on the second intersection, to obtain candidate computation results for respective data entries in the second intersection; and determining, based on the matching flags for respective data entries in the second intersection and the candidate computation results, a target computation result of the MPC.

In some embodiments, the matching flags for respective data entries in the second intersection are set to 0, and determining the target computation result comprises: generating a target computation result of the MPC based at least on a multiplication operation between the candidate computation results and the matching flags for respective data entries in the second intersection.

Figure 7:
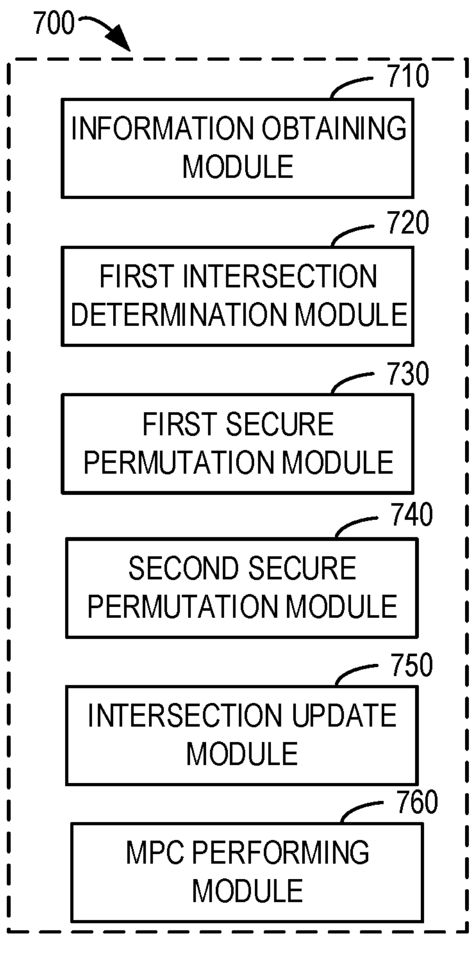
FIG. 7 shows a schematic structural block diagram of a data processing apparatus implemented at a first party according to some embodiments of the present disclosure.

FIG. 7 shows a schematic structural block diagram of a data processing apparatus 700 implemented at a first party according to some embodiments of the present disclosure. The apparatus 700 can be implemented or included in the party 110. Each module/component in the apparatus 700 can be implemented by hardware, software, firmware, or any combination thereof.

As shown in the figure, the apparatus 700 comprises an information obtaining module 710 configured to obtain first double-encrypted identification information and a first feature share and a second feature share of first feature information of respective data entries in a first dataset of the first party, and second double-encrypted identification information and a third feature share of second feature information of respective data entries in a second dataset of a second party in the MPC. The apparatus 700 further comprises a first intersection determination module 720 configured to determine a first intersection of the first dataset and the second dataset by matching the first double-encrypted identification information with the second double-encrypted identification information, data entries in the first intersection comprising matched identification information, and the second feature share of the first feature information and the third feature share of the second feature information identified by the identification information. The apparatus 700 further comprises a first secure permutation module 730 configured to perform, using the first feature share of the first feature information, a first round of secure permutation on the first feature information with the second party, to obtain a first target feature share of the first feature information. The apparatus 700 further comprises a second secure permutation module 740 configured to perform, using the third feature share of the second feature information, a second round of secure permutation on the second feature information with the second party, to obtain a first target feature share of the second feature information.

The apparatus 700 further comprises an intersection update module 750 configured to update the first intersection based on the first target feature share of the first feature information and the first target feature share of the second feature information; and an MPC performing module 760, configured to perform the MPC with the second party based on the updated first intersection.

In some embodiments, the apparatus 700 further comprises: a primary encryption module configured to before obtaining the first double-encrypted identification information and the first feature share of the first feature information, encrypting first identification information of respective data entries in the first dataset, to obtain first encrypted identification information; a feature share generation module configured to generate, based on the first feature share of the first feature information, the third feature share of the first feature information; and a feature share sending module configured to send the first encrypted identification information and the third feature share of the first feature information to the second party for generating and sending, by the second party, the first double-encrypted identification information and the first feature share of the first feature information to the first party.

In some embodiments, the primary encryption module is configured to encrypt, using a first encryption key, the first identification information of respective data entries in the first dataset, to obtain the first encrypted identification information. The first double-encrypted identification information is obtained after encrypting the first identification information by the second party using a second encryption key.

In some embodiments, the information obtaining module 710 comprises: a first information receiving module configured to receive, from the second party, the second encrypted identification information and the third feature share of the second feature information of respective data entries in the second dataset of the second party, the second encrypted identification information being obtained by encryption by the second party using the second encryption key; and a secondary encryption module configured to perform, using the first encryption key, secondary encryption on the second encrypted identification information, to obtain the second double-encrypted identification information.

In some embodiments, the information obtaining module 710 comprises a second information receiving module configured receive, from the second party, the first double-encrypted identification information and the second feature share of the first feature information, a correspondence between the first double-encrypted identification information and the second feature share of the first feature information being permutated by the second party based on first permutation information.

In some embodiments, at least the first permutation information used by the second party in the first round of secure permutation.

In some embodiments, the second secure permutation module 740 comprises a permutation information generation module configured to generate, based on a matching between the first double-encrypted identification information and the second double-encrypted identification information, second permutation information corresponding to the second encrypted identification information for the second party; and a secure performing module configured to perform, using the second permutation information and the third feature share of the second feature information, the second round of secure permutation with the second party.

In some embodiments, the permutation information generation module is configured to in accordance with a determination that the double-encrypted identification information of a first data entry in the first dataset and a second data entry in the second dataset matches with each other based on the matching, generate the second permutation information to comprise an index of a position of the first data entry or the second data entry; and in accordance with a determination that the double-encrypted identification information of the first data entry and the second data entry mismatches with each other based on the matching, generate the second permutation information to comprise a pseudo index.

In some embodiments, the intersection update module 750 is configured to update the first intersection, in the updated first intersection, the second feature share of the first feature information being updated to be a sum of the first target feature share and the second feature share of the first feature information, and the third feature share of the second feature information being updated to be the first target feature share of the second feature information.

In some embodiments, before the first round of secure permutation, the apparatus 700 further comprises a filling module configured to in accordance with a determination that a number of data entries in the first dataset is not equal to a number of data entries in the second dataset, cause the number of data entries in the first dataset equal to the number of data entries in the second dataset by filling in a pseudo data entry.

In some embodiments, the apparatus 700 further comprises a flag setting module configured to set matching flags for respective data entries in the updated first intersection, wherein a matching flag for data entries with matched double-encrypted identification information is set to a first value indicating a true match of identification information, a matching flag for data entries with mismatched double-encrypted identification information is set to a second value indicating a pseudo match of identification information.

In some embodiments, the MPC performing module 760 comprises a candidate result determination module configured to perform the MPC with the second party based on the updated first intersection, to obtain candidate computation results for respective data entries in the updated first intersection; and a target result determination module configured to determine, based on the matching flags for respective data entries in the updated first intersection and the candidate computation results, a target computation result of the MPC.

In some embodiments, the first value is set to 1, the second value is set to 0, and determining the target computation result comprises: generating a target computation result of the MPC based at least on a multiplication operation between the matching flags for respective data entries in the updated first intersection and the candidate computation results.

Figure 8:
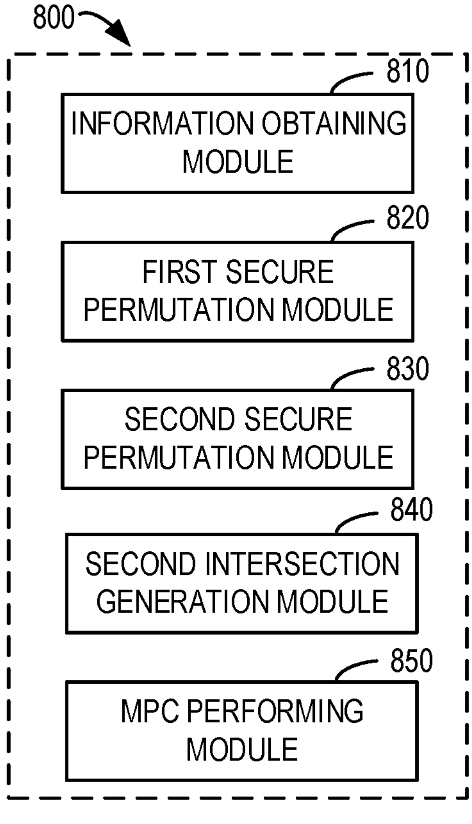
FIG. 8 shows a schematic structural block diagram of a data processing apparatus implemented at a second party according to some embodiments of the present disclosure.

FIG. 8 shows a schematic structural block diagram of a data processing apparatus 800 implemented at a second party according to some embodiments of the present disclosure. The apparatus 800 can be implemented or included in party 120. Each module/component in the apparatus 800 can be implemented by hardware, software, firmware, or any combination of them.

As shown in the figure, the apparatus 800 comprises an information obtaining module 810 configured to obtain a fourth feature share of first feature information for respective data entries in a first dataset of a first party in the MPC and first permutation information for the first dataset, and a first feature share of second feature information for respective data entries in a second dataset of the second party.

The apparatus 800 further comprises a first secure permutation module 820 configured to perform, using the first permutation information and the fourth feature share of the first feature information, a first round of secure permutation on the first feature information with the first party, to obtain a second target feature share of the first feature information.

The apparatus 800 further comprises a second secure permutation module 830 configured to perform, using the first feature share of the second feature information, a second round of secure permutation on the second feature information with the first party, to obtain a second target feature share of the second feature information.

The apparatus 800 further comprises a second intersection generation module 840 configured to generate a second intersection for the first dataset and the second dataset based on the second target feature share of the first feature information and a first target feature share of the second feature information. The apparatus 800 further comprises an MPC performing module 850 configured to perform the MPC with the first party based on the second intersection.

In some embodiments, the apparatus 800 further comprises a primary encryption module configured to encrypt second identification information of respective data entries in the second dataset, to obtain second encrypted identification information; a first feature share generation module configured to generate, based on the first feature share of the second feature information, the third feature share of the second feature information; and a feature share sending module configured to send the second encrypted identification information and the third feature share of the second feature information to the first party for determining and sending, by the first party, the first feature share of the second feature information to the second party.

In some embodiments, the apparatus 800 further comprises a feature share receiving module configured to before performing the first round of secure permutation, receiving, from the first party, the first encrypted identification information and a third feature share of the first feature information; a secondary encryption module configured to perform secondary encryption on the first encrypted identification information, to obtain the first double-encrypted identification information; a first feature share generation module configured to generate the second feature share of the first feature information based on the third feature share and the fourth feature share of the first feature information; a permutation module configured to permutate, using first permutation information, a correspondence between the first double-encrypted identification information and the second feature share of the first feature information; and a message sending module configured to send, to the first party, the permutated first double-encrypted identification information and the permutated second feature share of the first feature information.

In some embodiments, the first encrypted identification information is encrypted by the first party using the first encryption key, and the secondary encryption module is configured to encrypt, using the second encryption key, the first identification information, to obtain the first double-encrypted identification information.

In some embodiments, data entries in the second intersection comprise no identification information, and the second target feature share of the first feature information corresponds to the first target feature share of the second feature information sequentially in a granularity of data entries.

In some embodiments, the MPC performing module 850 comprises a flag setting module configured to set matching flags for respective data entries in the second intersection, the matching flags being set to indicate a pseudo match of identification information; a candidate result determination module configured to perform the MPC with the first party based on the second intersection, to obtain candidate computation results for respective data entries in the second intersection; and a target result determination module configured to determine, based on the matching flags for respective data entries in the second intersection and the candidate computation results, a target computation result of the MPC.

In some embodiments, the matching flags for respective data entries in the second intersection are set to 0, and the target result determination module is configured to determine generating a target computation result of the MPC based at least on a multiplication operation between the candidate computation results and the matching flags for respective data entries in the second intersection.

Figure 9:
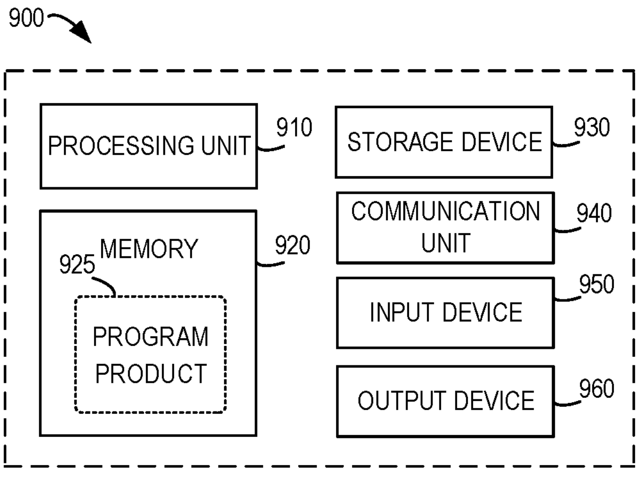
FIG. 9 shows a block diagram of an electronic device capable of implementing one or more embodiments of the present disclosure.

FIG. 9 shows a block diagram of an electronic device 900 in which one or more embodiments of the present disclosure may be implemented. It would be appreciated that the electronic device 900 shown in FIG. 9 is only an example and should not constitute any restriction on the function and scope of the embodiments described herein. The electronic device 900 shown in FIG. 9 may be used to implement the party 110 or the party 120 of FIG. 1, the apparatus 700 of FIG. 7 or the apparatus 800 of FIG. 8.

As shown in FIG. 9, the electronic device 900 is in the form of a general computing device. The components of the electronic device 900 may include, but are not limited to, one or more processors or processing units 910, a memory 920, a storage device 930, one or more communication units 940, one or more input devices 950, and one or more output devices 960. The processing unit 910 may be an actual or virtual processor and can execute various processes according to the programs stored in the memory 920. In a multiprocessor system, multiple processing units execute computer executable instructions in parallel to improve the parallel processing capability of the electronic device 900.

The electronic device 900 typically comprises a variety of computer storage medium. Such medium may be any available medium that is accessible to the electronic device 900, including but not limited to volatile and non-volatile medium, removable and non-removable medium. The memory 920 may be volatile memory (for example, a register, cache, a random access memory (RAM)), a non-volatile memory (for example, a read-only memory (ROM), an electrically erasable programmable read-only memory (EEPROM), a flash memory) or any combination thereof. The storage device 930 may be any removable or non-removable medium, and may include a machine-readable medium, such as a flash drive, a disk, or any other medium, which can be used to store information and/or data (such as training data for training) and can be accessed within the electronic device 900.

The electronic device 900 may further include additional removable/non-removable, volatile/non-volatile storage medium. Although not shown in FIG. 9, a disk driver for reading from or writing to a removable, non-volatile disk (such as a "floppy disk"), and an optical disk driver for reading from or writing to a removable, non-volatile optical disk can be provided. In these cases, each driver may be connected to the bus (not shown) by one or more data medium interfaces. The memory 920 may include a computer program product 925, which has one or more program modules configured to perform various methods or acts of various embodiments of the present disclosure.

The communication unit 940 communicates with a further computing device through the communication medium. In addition, functions of components in the electronic device 900 may be implemented by a single computing cluster or multiple computing machines, which can communicate through a communication connection. Therefore, the electronic device 900 may be operated in a networking environment using a logical connection with one or more other servers, a network personal computer (PC), or another network node.

The input device 950 may be one or more input devices, such as a mouse, a keyboard, a trackball, etc. The output device 960 may be one or more output devices, such as a display, a speaker, a printer, etc. The electronic device 900 may also communicate with one or more external devices (not shown) through the communication unit 940 as required. The external device, such as a storage device, a display device, etc., communicate with one or more devices that enable users to interact with the electronic device 900, or communicate with any device (for example, a network card, a modem, etc.) that makes the electronic device 900 communicate with one or more other computing devices. Such communication may be executed via an input/output (I/O) interface (not shown).

According to example implementation of the present disclosure, a computer-readable storage medium is provided, on which a computer-executable instruction or computer program is stored, wherein the computer-executable instructions or the computer program is executed by the processor to implement the method described above. According to example implementation of the present disclosure, a computer program product is also provided. The computer program product is physically stored on a non-transient computer-readable medium and comprises computer-executable instructions, which are executed by the processor to implement the method described above.

Various aspects of the present disclosure are described herein with reference to the flow chart and/or the block diagram of the method, the device, the equipment and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, special computers or other programmable data processing devices to produce a machine that generates a device to implement the functions/acts specified in one or more blocks in the flow chart and/or the block diagram when these instructions are executed through the processing units of the computer or other programmable data processing devices. These computer-readable program instructions may also be stored in a computer-readable storage medium. These instructions enable a computer, a programmable data processing device and/or other devices to work in a specific way. Therefore, the computer-readable medium containing the instructions comprises a product, which comprises instructions to implement various aspects of the functions/acts specified in one or more blocks in the flowchart and/or the block diagram.

The computer-readable program instructions may be loaded onto a computer, other programmable data processing apparatus, or other devices, so that a series of operational steps can be performed on a computer, other programmable data processing apparatus, or other devices, to generate a computer-implemented process, such that the instructions which execute on a computer, other programmable data processing apparatus, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment or instructions, which contains one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is exemplary, not exhaustive, and is not limited to the disclosed implementations. Without departing from the scope and spirit of the described implementations, many modifications and changes are obvious to ordinary skill in the art. The selection of terms used in this article aims to best explain the principles, practical application or improvement of technology in the market of each implementation, or to enable other ordinary skill in the art to understand the various embodiments disclosed herein.

We claim:

1. A data processing method implemented at a first party (C) in secure multi-party computing (MPC), the method comprising:

obtaining first double-encrypted identification information ($\widetilde{Cid_i}$) and a first feature share ($[u_{i,j}]_0$) and a second feature share ($u''_{i,j}$) of first feature information ($u_{i,j}$) of respective data entries in a first dataset of the first party (C), and second double-encrypted identification information ($\widetilde{Pid_i}$) and a third feature share ($v'_{i,j}$) of second feature information ($v_{i,j}$) of respective data entries in a second dataset of a second party (P) in the MPC;

determining a first intersection of the first dataset and the second dataset by matching the first double-encrypted identification information ($\widetilde{Cid_i}$) with the second double-encrypted identification information ($\widetilde{Pid_i}$), data entries in the first intersection comprising matched identification information, and the second feature share ($u''_{i,j}$) of the first feature information ($u_{i,j}$) and the third feature share ($v'_{i,j}$) of the second feature information ($v_{i,j}$) identified by the identification information;

performing, using the first feature share ($[u_{i,j}]_0$) of the first feature information ($u_{i,j}$), a first round of secure permutation on the first feature information with the second party (P), to obtain a first target feature share ($[\delta_{i,j}]_0$) of the first feature information ($u_{i,j}$);

performing, using the third feature share ($v'_{i,j}$) of the second feature information ($v_{i,j}$), a second round of secure permutation on the second feature information with the second party (P), to obtain a first target feature share ($[\gamma_{i,j}]_0$) of the second feature information ($v_{i,j}$);

updating the first intersection based on the first target feature share ($[\delta_{i,j}]_0$) of the first feature information ($u_{i,j}$) and the first target feature share ($[\gamma_{i,j}]_0$) of the second feature information ($v_{i,j}$); and performing the MPC with the second party based on the updated first intersection.

2. The method of claim 1, wherein obtaining the first double-encrypted identification information ($\widetilde{Cid_i}$) and the second feature share ($u''_{i,j}$) of the first feature information ($u_{i,j}$) comprises:

receiving, from the second party (P), the first double-encrypted identification information ($\widetilde{Cid_i}$) and the second feature share ($u''_{i,j}$) of the first feature information ($u_{i,j}$), a correspondence between the first double-encrypted identification information ($\widetilde{Cid_i}$) and the second feature share ($u''_{i,j}$) of the first feature information ($u_{i,j}$) being permutated by the second party (P) based on first permutation information ($\pi_1$).

3. The method of claim 2, wherein at least the first permutation information ($\pi_1$) used by the second party (P) in the first round of secure permutation.

4. The method of claim 1, wherein performing the second round of secure permutation with the second party (P) comprises:

generating, based on a matching between the first double-encrypted identification information ($\widetilde{Cid_i}$) and the second double-encrypted identification information ($\widetilde{Pid_i}$), second permutation information ($\pi_0$) corresponding to the second encrypted identification information ($Pid'_i$) for the second party (P); and performing, using the second permutation information ($\pi_0$) and the third feature share ($v'_{i,j}$) of the second feature information ($v_{i,j}$), the second round of secure permutation with the second party (P).

5. The method of claim 4, wherein generating the second permutation information ($\pi_0$) comprises:

in accordance with a determination that the double-encrypted identification information of a first data entry in the first dataset and a second data entry in the second dataset matches with each other based on the matching, generating the second permutation information ($\pi_0$) to comprise an index of a position of the first data entry or the second data entry; and in accordance with a determination that the double-encrypted identification information of the first data entry and the second data entry mismatches with each other based on the matching, generating the second permutation information ($\pi_0$) to comprise a pseudo index.

6. The method of claim 1, wherein updating the first intersection comprises:

updating the first intersection, in the updated first intersection, the second feature share ($u''_{i,j}$) of the first feature information ($u_{i,j}$) being updated to be a sum of the first target feature share ($[\delta_{i,j}]_0$) and the second feature share ($u''_{i,j}$) of the first feature information, and the third feature share ($v'_{i,j}$) of the second feature information being updated to be the first target feature share ($[\gamma_{i,j}]_0$) of the second feature information ($v_{i,j}$).

7. The method of claim 5, further comprising:

setting matching flags for respective data entries in the updated first intersection, wherein a matching flag for data entries with matched double-encrypted identification information is set to a first value indicating a true match of identification information, a matching flag for data entries with mismatched double-encrypted identification information is set to a second value indicating a pseudo match of identification information.

8. The method of claim 7, wherein performing the MPC comprises:

performing the MPC with the second party based on the updated first intersection, to obtain candidate computation results for respective data entries in the updated first intersection; and determining, based on the matching flags for respective data entries in the updated first intersection and the candidate computation results, a target computation result of the MPC.

9. The method of claim 8, wherein the first value is set to 1, the second value is set to 0, and determining the target computation result comprises:

generating a target computation result of the MPC based at least on a multiplication operation between the matching flags for respective data entries in the updated first intersection and the candidate computation results.

10. A method for data processing implemented at a second party (P) in secure multi-party computing (MPC), the method comprising:

obtaining a fourth feature share ($[u_{i,j}]_1$) of first feature information ($u_{i,j}$) for respective data entries in a first dataset of a first party (C) in the MPC and first permutation information ($\pi_1$) for the first dataset, and a first feature share ($[v_{i,j}]_0$) of second feature information ($v_{i,j}$) for respective data entries in a second dataset of the second party (P);

performing, using the first permutation information ($\pi_1$) and the fourth feature share ($[u_{i,j}]_1$) of the first feature information ($u_{i,j}$), a first round of secure permutation on the first feature information with the first party (C), to obtain a second target feature share ($[\delta_{i,j}]_1$) of the first feature information ($u_{i,j}$);

performing, using the first feature share ($[v_{i,j}]_0$) of the second feature information ($v_{i,j}$), a second round of secure permutation on the second feature information with the first party (C), to obtain a second target feature share ($[\gamma_{i,j}]_1$) of the second feature information ($v_{i,j}$);

generating a second intersection for the first dataset and the second dataset based on the second target feature share ($[\delta_{i,j}]_1$) of the first feature information ($u_{i,j}$) and a first target feature share ($[\gamma_{i,j}]_0$) of the second feature information ($v_{i,j}$); and performing the MPC with the first party based on the second intersection.

11. The method of claim 10, the method further comprising: before performing the first round of secure permutation, receiving, from the first party (C), the first encrypted identification information ($\widetilde{Cid}_i$) and a third feature share ($u'_{i,j}$) of the first feature information ($u_{i,j}$);

performing secondary encryption on the first encrypted identification information ($\widetilde{Cid}_i$), to obtain the first double-encrypted identification information ($\widetilde{Cid}_i$);

generating the second feature share ($u''_{i,j}$) of the first feature information ($u_{i,j}$) based on the third feature share ($u'_{i,j}$) and the fourth feature share ($[u_{i,j}]_1$) of the first feature information ($u_{i,j}$);

permutating, using first permutation information ($\pi_1$), a correspondence between the first double-encrypted identification information ($\widetilde{Cid}_i$) and the second feature share ($u''_{i,j}$) of the first feature information ($u_{i,j}$); and sending, to the first party (C), the permutated first double-encrypted identification information ($\widetilde{Cid}_i$) and the permutated second feature share ($u''_{i,j}$) of the first feature information ($u_{i,j}$).

12. The method of claim 11, wherein data entries in the second intersection comprise no identification information, and the second target feature share ($[\delta_{i,j}]_1$) of the first feature information ($u_{i,j}$) corresponds to the first target feature share ($[\gamma_{i,j}]_0$) of the second feature information ($v_{i,j}$) sequentially in a granularity of data entries.

13. The method of claim 12, wherein performing the MPC comprises:

setting matching flags for respective data entries in the second intersection, the matching flags being set to indicate a pseudo match of identification information;

performing the MPC with the first party based on the second intersection, to obtain candidate computation results for respective data entries in the second intersection; and determining, based on the matching flags for respective data entries in the second intersection and the candidate computation results, a target computation result of the MPC.

14. The method of claim 13, wherein the matching flags for respective data entries in the second intersection are set to 0, and determining the target computation result comprises:

generating a target computation result of the MPC based at least on a multiplication operation between the candidate computation results and the matching flags for respective data entries in the second intersection.

15. An electronic device, comprising:

at least one processing unit; and at least one memory coupled to the at least one processing unit and storing instructions executable by the at least one processing unit, the instructions, when executed by the at least one processing unit, causing the device to perform a data processing method implemented at a first party (C) in secure multi-party computing (MPC), the method comprising:

obtaining first double-encrypted identification information ($\widetilde{Cid}_i$) and a first feature share ($[u_{i,j}]_0$) and a second feature share ($u''_{i,j}$) of first feature information ($u_{i,j}$) of respective data entries in a first dataset of the first party (C), and second double-encrypted identification information ($\widetilde{Pid}_i$) and a third feature share ($v'_{i,j}$) of second feature information ($v_{i,j}$) of respective data entries in a second dataset of a second party (P) in the MPC;

determining a first intersection of the first dataset and the second dataset by matching the first double-encrypted identification information ($\widetilde{Cid}_i$) with the second double-encrypted identification information ($\widetilde{Pid}_i$), data entries in the first intersection comprising matched identification information, and the second feature share ($u''_{i,j}$) of the first feature information ($u_{i,j}$) and the third feature share ($v'_{i,j}$) of the second feature information ($v_{i,j}$) identified by the identification information;

performing, using the first feature share ($[u_{i,j}]_0$) of the first feature information ($u_{i,j}$), a first round of secure permutation on the first feature information with the second party (P), to obtain a first target feature share ($[\delta_{i,j}]_0$) of the first feature information ($u_{i,j}$);

performing, using the third feature share ($v'_{i,j}$) of the second feature information ($v_{i,j}$), a second round of secure permutation on the second feature information with the second party (P), to obtain a first target feature share ($[\gamma_{i,j}]_0$) of the second feature information ($v_{i,j}$);

updating the first intersection based on the first target feature share ($[\delta_{i,j}]_0$) of the first feature information ($u_{i,j}$) and the first target feature share ($[\gamma_{i,j}]_0$) of the second feature information ($v_{i,j}$); and performing the MPC with the second party based on the updated first intersection.

16. The electronic device of claim 15, wherein obtaining the first double-encrypted identification information ($\widetilde{Cid}_i$) and the second feature share ($u''_{i,j}$) of the first feature information ($u_{i,j}$) comprises:

receiving, from the second party (P), the first double-encrypted identification information ($\widetilde{Cid}_i$) and the second feature share ($u''_{i,j}$) of the first feature information ($u_{i,j}$), a correspondence between the first double-encrypted identification information ($\widetilde{Cid}_i$) and the second feature share ($u''_{i,j}$) of the first feature information ($u_{i,j}$) being permutated by the second party (P) based on first permutation information ($\pi_1$).

17. The electronic device of claim 16, wherein at least the first permutation information ($\pi_1$) used by the second party (P) in the first round of secure permutation.

18. The electronic device of claim 15, wherein performing the second round of secure permutation with the second party (P) comprises:

generating, based on a matching between the first double-encrypted identification information ($\widetilde{Cid}_i$) and the second double-encrypted identification information ($\widetilde{Pid}_i$), second permutation information ($\pi_0$) corresponding to the second encrypted identification information ($Pid'_i$) for the second party (P); and performing, using the second permutation information ($\pi_0$) and the third feature share ($v'_{i,j}$) of the second feature information ($v_{i,j}$), the second round of secure permutation with the second party (P).

19. The electronic device of claim 18, wherein generating the second permutation information ($\pi_0$) comprises:

in accordance with a determination that the double-encrypted identification information of a first data entry in the first dataset and a second data entry in the second dataset matches with each other based on the matching, generating the second permutation information ($\pi_0$) to comprise an index of a position of the first data entry or the second data entry; and in accordance with a determination that the double-encrypted identification information of the first data entry and the second data entry mismatches with each other based on the matching, generating the second permutation information ($\pi_0$) to comprise a pseudo index.

20. The electronic device of claim 15, wherein updating the first intersection comprises:

updating the first intersection, in the updated first intersection, the second feature share ($u''_{i,j}$) of the first feature information ($u_{i,j}$) being updated to be a sum of the first target feature share ($[\delta_{i,j}]_0$) and the second feature share ($u''_{i,j}$) of the first feature information, and the third feature share ($v'_{i,j}$) of the second feature information being updated to be the first target feature share ($[\gamma_{i,j}]_0$) of the second feature information ($v_{i,j}$).

* * * * *